United States Patent
Doudrick et al.

(10) Patent No.: US 11,926,545 B2
(45) Date of Patent: Mar. 12, 2024

(54) CATALYTIC HYDROGEL MEMBRANE REACTOR FOR TREATMENT OF AQUEOUS CONTAMINANTS

(71) Applicant: University of Notre Dame du Lac, South Bend, IN (US)

(72) Inventors: Kyle Doudrick, South Bend, IN (US); Robert Nerenberg, South Bend, IN (US); Randal Marks, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 446 days.

(21) Appl. No.: 17/269,204

(22) PCT Filed: Nov. 8, 2019

(86) PCT No.: PCT/US2019/060613
§ 371 (c)(1),
(2) Date: Feb. 17, 2021

(87) PCT Pub. No.: WO2020/097559
PCT Pub. Date: May 14, 2020

(65) Prior Publication Data
US 2021/0230028 A1    Jul. 29, 2021

Related U.S. Application Data

(60) Provisional application No. 62/889,762, filed on Aug. 21, 2019, provisional application No. 62/757,545, filed on Nov. 8, 2018.

(51) Int. Cl.
*C02F 1/70* (2023.01)
*B01D 67/00* (2006.01)
(Continued)

(52) U.S. Cl.
CPC ............ *C02F 1/70* (2013.01); *B01D 67/0088* (2013.01); *B01D 69/02* (2013.01); *B01D 69/08* (2013.01);
(Continued)

(58) Field of Classification Search
CPC ....... C02F 1/70; B01D 67/0088; B01D 69/02; B01D 69/08; B01D 69/145; B01D 71/027; B01J 23/44; B01J 35/0013
See application file for complete search history.

(56) References Cited

U.S. PATENT DOCUMENTS 3,865,716 A * 2/1975 Sosnowski ............. B01J 29/061
                                                       208/143
4,266,026 A    5/1981 Breslau
(Continued)

FOREIGN PATENT DOCUMENTS

| DE | 10064622 A1 | | 3/2006 |
| KR | 20160004310 A | * | 1/2016 |
| WO | WO9006996 A1 | | 6/1990 |

OTHER PUBLICATIONS

Ahmed et al., "Oxygen transfer characteristics of hollow fiber, composite membranes", Advances in Environmental Research 2004, 8, (3-4), pp. 637-646.
(Continued)

*Primary Examiner* — Chester T Barry
(74) *Attorney, Agent, or Firm* — Michael Best & Friedrich LLP

(57) ABSTRACT

Provided are catalytic assemblies which include a hollow fiber membrane permeable to a gas; a reactive coating permeable to the gas and a contaminant; and a plurality of catalytic nanoparticles embedded in the reactive coating adapted to catalyze a reaction between the gas and the contaminant. Also provided are preparation methods for the
(Continued)

catalytic assemblies, and use thereof for treating contaminated water.

19 Claims, 23 Drawing Sheets

(51) Int. Cl.
| | |
|---|---|
| B01D 69/02 | (2006.01) |
| B01D 69/08 | (2006.01) |
| B01D 69/14 | (2006.01) |
| B01D 71/02 | (2006.01) |
| B01J 23/44 | (2006.01) |
| B01J 35/00 | (2006.01) |
| C02F 101/16 | (2006.01) |

(52) U.S. Cl.
CPC ......... *B01D 69/145* (2013.01); *B01D 71/027* (2013.01); *B01J 23/44* (2013.01); *B01J 35/0013* (2013.01); B01D 2325/04 (2013.01); B01D 2325/10 (2013.01); C02F 2101/166 (2013.01); C02F 2305/08 (2013.01)

(56) References Cited

U.S. PATENT DOCUMENTS

| | | | | |
|---|---|---|---|---|
| 5,507,956 | A * | 4/1996 | Bonse | B01J 35/1066 423/628 |
| 5,523,003 | A | 6/1996 | Sell et al. | |
| 6,054,142 | A * | 4/2000 | Li | A61P 25/16 524/21 |
| 6,121,180 | A * | 9/2000 | Gevelinger | B01J 38/44 502/40 |
| 2011/0223650 | A1* | 9/2011 | Saunders | B01D 53/226 435/283.1 |
| 2012/0308531 | A1* | 12/2012 | Pinxteren | C12M 23/06 435/400 |
| 2013/0206673 | A1* | 8/2013 | Ying | B01D 71/68 210/321.87 |
| 2018/0043298 | A1 | 2/2018 | Liskey et al. | |
| 2019/0099719 | A1* | 4/2019 | Al-Ahmed | C02F 3/1268 |
| 2021/0179463 | A1* | 6/2021 | Zhou | C02F 3/2853 |

OTHER PUBLICATIONS

Ai et al., "Catalytic reduction of 4-nitrophenol by silver nanoparticles stabilized on environmentally benign macroscopic biopolymer hydrogel", Bioresource Technology 2013, 132, pp. 374-377.
Ai et al., "Environmentally friendly light-driven synthesis of Ag nanoparticles in situ grown on magnetically separable biohydrogels as highly active and recyclable catalysts for 4-nitrophenol reduction", Journal of Materials Chemistry 2012, 22, (44), pp. 23447-23453.
Bajpai et al., "Investigation of swelling/degradation behaviour of alginate beads crosslinked with Ca2+ and Ba2+ ions", Reactive & Functional Polymers 2004, 59, (2), pp. 129-140.
Bergquist et al., "Evaluation of a hybrid ion exchange-catalyst treatment technology for nitrate removal from drinking water", Water Research, 2016, vol. 96, pp. 177-187.
Bertoch et al., "Catalytic Nitrate Removal in a Trickle Bed Reactor: Direct Drinking Water Treatment", Journal American Water Works Association 2017, vol. 109, No. 5, pp. E144-E157.
CAS Reg No. 9005-38-3.
Centi et al., "Tubular inorganic catalytic membrane reactors: advantages and performance in multiphase hydrogenation reactions", Catalysis Today 2003, 79, (1-4), pp. 139-149.
Chaplin et al., "Critical Review of Pd-Based Catalytic Treatment of Priority Contaminants in Water", Environmental Science & Technology, vol. 46, No. 7, 2012, pp. 3655-3670.
Chaplin et al., "Effects of natural water ions and humic acid on catalytic nitrate reduction kinetics using an alumina supported Pd—Cu catalyst", Environmental Science & Technology 2006, 40, (9), pp. 3075-3081.
Chen et al., "Catalytic hydrogenation of nitrate on Cu—Pd supported on titanate nanotube and the experiment after aging, sulfide fouling and regeneration procedures", Applied Catalysis B—Environmental 2013, 142, pp. 65-71.
Chen et al., "In-Situ Synthesis of Noble Metal Nanoparticles in Alginate Solution and Their Application in Catalysis", Journal of Nanoscience and Nanotechnology 2009, 9, (4), pp. 2628-2633.
Chinthaginjala et al., "Thin layer of carbon-nano-fibers (CNFs) as catalyst support for fast mass transfer in hydrogenation of nitrite", Applied Catalysis a—General 2010, 383, (1-2), pp. 24-32.
Choe et al., "Performance and life cycle environmental benefits of recycling spent ion exchange brines by catalytic treatment of nitrate", Water Research, 2015, vol. 80, pp. 267-280.
Chtchigrovsky et al., "Dramatic Effect of the Gelling Cation on the Catalytic Performances of Alginate Supported Palladium Nanoparticles for the Suzuki-Miyaura Reaction", Chemistry of Materials, 2012, 24, (8), pp. 1505-1510.
Chuang et al., "Effects of pH on the Shape of Alginate Particles and Its Release Behavior", International Journal of Polymer Science, 2017, 9 pages.
Daub et al., "Studies on the use of catalytic membranes for reduction of nitrate in drinking water", Chemical Engineering Science 1999, 54, (10), pp. 1577-1582.
Davie et al., "Implementing Heterogeneous Catalytic Dechlorination Technology for Remediating TCE-Contaminated Groundwater", Environmental Science & Technology, vol. 42, No. 23, 2008, pp. 8908-8915.
Dittmeyer et al., "A review of catalytic membrane layers for gas/liquid reactions", Topics in Catalysis 2004, 29, (1-2), pp. 3-27.
Dittmeyer et al., "Membrane reactors for hydrogenation and dehydrogenation processes based on supported palladium", Journal of Molecular Catalysis A—Chemical 2001, 173, (1-2), pp. 135-184.
Draget et al., "Similarities and differences between alginic acid gels and ionically crosslinked alginate gels", Food Hydrocolloids 2006, 20, (2-3), pp. 170-175.
Espinosa et al., "Carbon nano-fiber based membrane reactor for selective nitrite hydrogenation", Catalysis Today 2016, 273, pp. 50-61.
Espinosa et al., "Egg shell membrane reactors for nitrite hydrogenation: Manipulating kinetics and selectivity", Applied Catalysis B—Environmental 2018, 224, pp. 276-282.
Espinosa et al., "Ni in CNFs: Highly Active for Nitrite Hydrogenation", ACS Catalysis 2016, vol. 6, No. 8, pp. 5432-5440.
Favre et al., "Diffusion of polyethyleneglycols in calcium alginate hydrogels", Colloids and Surfaces A—Physicochemical and Engineering Aspects 2001, 194, (1-3), pp. 197-206.
Francis et al., "An ice-templated, linearly aligned chitosan-alginate scaffold for neural tissue engineering", Journal of Biomedical Materials Research Part A, 2013, vol. 101, No. 12, pp. 3493-3503.
Garbayo et al., "Diffusion characteristics of nitrate and glycerol in alginate", Colloids and Surfaces B—Biointerfaces 2002, vol. 25, (1), pp. 1-9.
Hinshelwood, "The kinetics of chemical change", Oxford, The Clarendon Press, 1940, pp. 603-604.
Holler et al., "Reduction of nitrite ions in water over Pd-supported on structured fibrous materials", Applied Catalysis B Environmental 2001, 32, vol. 3, pp. 143-150.
Horold et al., "Catalytical Removal of Nitrate and Nitrite from Drinking-Water, 1. Screening for Catalysts and Influence of Reaction Conditions on Activity and Selectivitity", Environmental Technology 1993, vol. 14, No. 10, pp. 931-939.
Horold et al., "Development of Catalysts for a Selective Nitrate and Nitrite Removal from Drinking-Water", Catalysis Today 1993, vol. 17, No. 1-2, pp. 21-30.
Hu et al., "Catalytic reduction for water treatment", Frontiers of Environmental Science & Engineering, vol. 12, No. 1, 2018, pp. 1-18.
Huai et al., "NO dissociation and reduction by H-2 on Pd(111): A first-principles study", Journal of Catalysis 2015, 322, pp. 73-83.

(56) References Cited

OTHER PUBLICATIONS

Huang et al., "Facile preparation of amorphous iron nanoparticles filled alginate matrix composites with high stability", Composites Science and Technology 2016, 134, pp. 168-174.
Idota et al., "Relationship between Physical Parameters of Various Metal Ions and Binding Affinity for Alginate", Biological & Pharmaceutical Bulletin 2016, 39, (11), pp. 1893-1896.
International Search Report and Written Opinion for Application No. PCT/US2019/060613 dated Jan. 17, 2020 (9 pages).
Jani et al., "Modeling of gas-liquid reactions in porous membrane microreactors", Journal of Membrane Science 2012, 419, pp. 57-64.
Jarrah, "Nitrite hydrogenation over palladium-carbon nanofiber foam: a parametric study using factorial design of experiments", Reaction Kinetics Mechanisms and Catalysis 2018, vol. 125, No. 1, pp. 287-301.
Lee et al., "Alginate: Properties and biomedical applications", Progress in Polymer Science 2012, vol. 37, No. 1, pp. 106-126.
Li et al., "Greenly Synthesized Gold-Alginate Nanocomposites Catalyst for Reducing Decoloration of Azo-Dyes", Nano 2015, vol. 10, No. 8, pp. 1550108-1-1550108-11.
Loureiro dos Santos, Natural Polymeric Biomaterials: Processing and Properties, Elsevier: 2017.
Mahmudov et al., "The reduction of perchlorate by hydrogenation catalysts", Applied Catalysis B—Environmental, vol. 81, 2008, pp. 78-87.
Maneerung et al., "Triple-layer catalytic hollow fiber membrane reactor for hydrogen production", Journal of Membrane Science, vol. 514, 2016, pp. 1-14.
Marks et al., "Catalytics Hydrogel Membrane Reactor for Treatment of Aqueous Contaminants", Environmental Science & Technology, vol. 53, No. 11, 2019, pp. 6492-6500.
Martin et al, "Assessing microbial competition in a hydrogen-based membrane biofilm reactor (MBfR) using multidimensional modeling", Biotechnology and Bioengineering 2015, 112, (9), pp. 1843-1853.
Martin et al., "Multidimensional modeling of biofilm development and fluid dynamics in a hydrogen-based, membrane biofilm reactor (MBfR)", Water Research 2013, 47, (13), pp. 4739-4751.
Martin et al., "The membrane biofilm reactor (MBfR) for water and wastewater treatment: Principles, applications, and recent developments", Bioresource Technology, vol. 122, 2012, pp. 83-94.
Martinez et al., "State-of-the-art and perspectives of the catalytic and electrocatalytic reduction of aqueous nitrates", Applied Catalysis B—Environmental, 2017, vol. 207, pp. 42-59.
Matatov-Meytal et al., "Activated carbon cloth-supported Pd—Cu catalyst: Application for continuous water denitrification", Catalysis Today 2005, 102, pp. 121-127.
Matatov-Meytal et al., "Cloth catalysts for water denitrification II. Removal of nitrates using Pd—Cu supported on glass fibers", Applied Catalysis B—Environmental 2001, vol. 31, No. 4, pp. 233-240.
Matatov-Meytal et al., "Cloth catalysts in water denitrification—I. Pd on glass fibers", Applied Catalysis B—Environmental, 2000, vol. 27, No. 2, pp. 127-135.
Matatov-Meytal et al., Cloth catalysts in water denitrification—III. pH inhibition of nitrite hydrogenation over Pd/ACC. Applied Catalysis B—Environmental 2003, 45, (2), pp. 127-134.
Matatov-Meytal et al., "The relation between surface composition of Pd—Cu/ACC catalysts prepared by selective deposition and their denitrification behavior", Catalysis Communications 2009, 10, (8), pp. 1137-1141.
Matyash et al., "Swelling and Mechanical Properties of Alginate Hydrogels with Respect to Promotion of Neural Growth. Tissue", Engineering Part C—Methods 2014, 20, (5), pp. 401-411.
Nakayama et al., "Catalytic Hydrogenation of Nitrate in Water Using a Pd—Cu/Al2O3 Catalyst and Dilute H-2 Microbubbles", Catalysis Letters 2015, 145, (9), pp. 1756-1763.
Nerenberg, "The membrane-biofilm reactor (MBfR) as a counter-diffusional biofilm process", Current Opinion in Biotechnology 2016, 38, pp. 131-136.
Pankhania et al., Hollow Fibre Bioreactor for Wastewater Treatment Using Bubbleless Membrane Aeration, Water Research, vol. 28, No. 10, 1994, pp. 2233-2236.
Papageorgiou et al., "Alginate fibers as photocatalyst immobilizing agents applied in hybrid photocatalytic/ultrafiltration water treatment processes", Water Research, vol. 46, 2012, pp. 1858-1872.
Pasut et al., "Mechanical and diffusive properties of homogeneous alginate gels in form of particles and cylinders", Journal of Biomedical Materials Research Part A 2008, 87A, (3), pp. 808-818.
Perez-Calleja et al., "Periodic venting of MABR lumen allows high removal rates and high gas-transfer efficiencies", Water Research 2017, 121, pp. 349-360.
Pintar et al., "Catalytic liquid-phase nitrite reduction: Kinetics and catalyst deactivation", Aiche Journal 1998, 44, (10), pp. 2280-2292.
Pintar et al., "Catalytic stepwise nitrate hydrogenation in batch-recycle fixed-bed reactors", Journal of Hazardous Materials, 2007, vol. 149, No. 2, pp. 387-398.
Pintar et al., "Kinetics of the catalytic liquid-phase hydrogenation of aqueous nitrate solutions", Applied Catalysis B—Environmental, vol. 11, No. 1, 1996, pp. 81-98.
Postma et al., "Competitive Adsorption of Nitrite and Hydrogen on Palladium during Nitrite Hydrogenation", Chemcatchem 2018, 10, (17), pp. 3770-3776.
Prusse et al., "Supported bimetallic palladium catalysts for water-phase nitrate reduction", Journal of Molecular Catalysis a—Chemical, vol. 173, No. 1-2, 2001, pp. 313-328.
Puguan et al., "Diffusion characteristics of different molecular weight solutes in Ca-alginate gel beads", Colloids and Surfaces a—Physicochemical and Engineering Aspects 2015, 469, pp. 158-165.
Qiao et al., "Controllable fabrication of a novel porous Ni-alginate hybrid material for hydrogenation", Applied Catalysis B Environmental 2017, 218, pp. 721-730.
Saha et al., "Photochemical Green Synthesis of Calcium-Alginate-Stabilized Ag and Au Nanoparticles and Their Catalytic Application to 4-Nitrophenol Reduction", Langmuir 2010, 26, (4), pp. 2885-2893.
Seraj et al., "PdAu Alloy Nanoparticle Catalysts: Effective Candidates for Nitrite Reduction in Water", ACS Catalysis 2017, 7, (5), pp. 3268-3276.
Shelstad et al., "Kinetics of the Vapor-Phase Oxidation of Napthalene over a Vanadium Catalyst", Canadian Journal of Chemical Engineering 1960, pp. 102-107.
Shuai et al., "Structure Sensitivity Study of Waterborne Contaminant Hydrogenation Using Shape- and Size-Controlled Pd Nanoparticles", ACS Catalysis, vol. 3, No. 3, 2013, pp. 453-463.
Soares et al., "Activated Carbon Supported Metal Catalysts for Nitrate and Nitrite Reduction in Water", Catalysis Letters, vol. 126, No. 3-4, 2008, pp. 253-260.
Strukul et al., "Use of palladium based catalysts in the hydrogenation of nitrates in drinking water: from powders to membranes", Catalysis Today 2000, 55, (1-2), pp. 139-149.
Tacke et al., "Kinetic Characterization of Catalysts for Selective Removal of Nitrate and Nitrite from Water", Chemie Ingenieur Technik 1993, 65, (12), pp. 1500-1502.
Thangaraj et al., "Greenly synthesised silver-alginate nanocomposites for degrading dyes and bacteria", Iet Nanobiotechnology 2018, 12, (1), pp. 47-51.
Tiancun et al., "Mechanism of Sulfur Poisoning on Supported Noble-Metal Catalyst—The Adsorption and Transformation of Sulfure on Palladium Catalysts with Different Supports", Catalysis Letters 1992, 12, (1-3), pp. 287-296.
Xuan et al., "Nitrogen-Doped Hierarchical Porous Carbons Derived from Sodium Alginate as Efficient Oxygen Reduction Reaction Electrocatalysts", Chemcatchem 2017, 9, (5), pp. 809-815.
Yoshinaga et al., "Hydrogenation of nitrate in water to nitrogen over Pd—Cu supported on active carbon", Journal of Catalysis, vol. 207, No. 1, 2002, pp. 37-45.
Zhao et al., "Adsorbed species on Pd catalyst during nitrite hydrogenation approaching complete conversion", Journal of Catalysis 2016, 337, pp. 102-110.

\* cited by examiner

FIG. 15A FIG. 15B
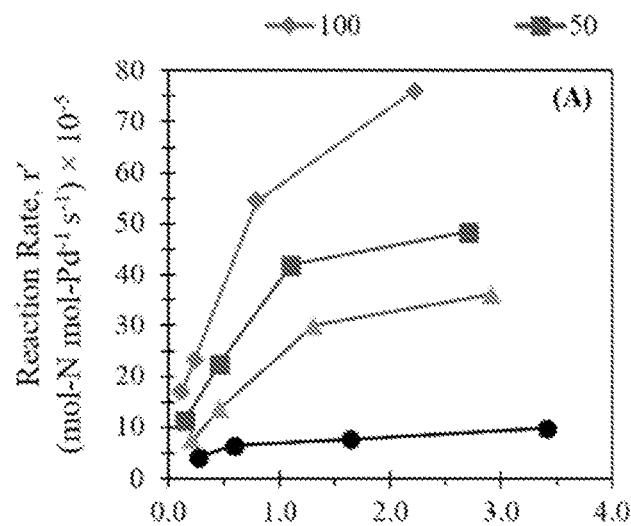
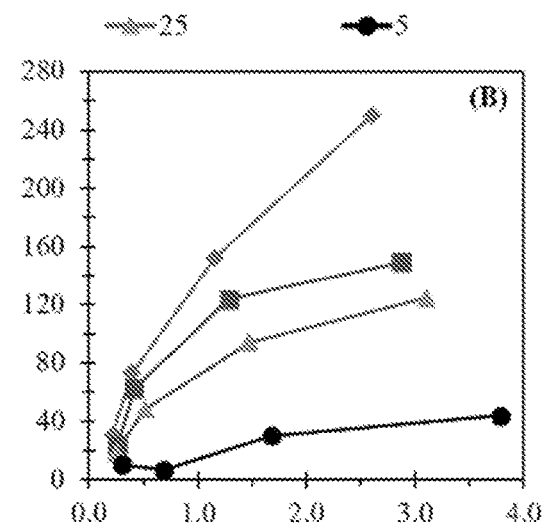
Effluent $NO_2^-$ Concentration (mM)
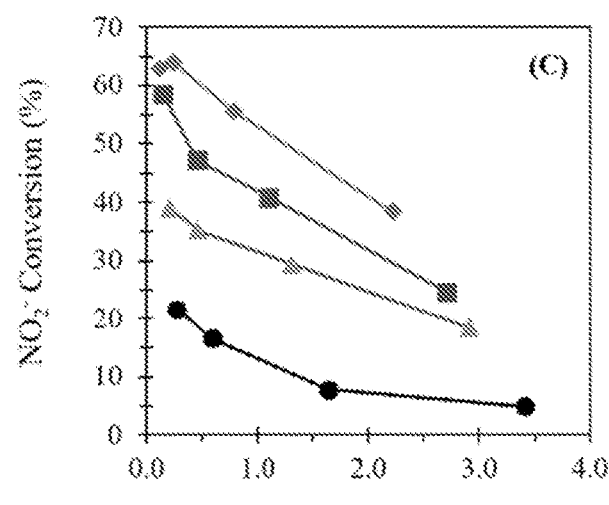
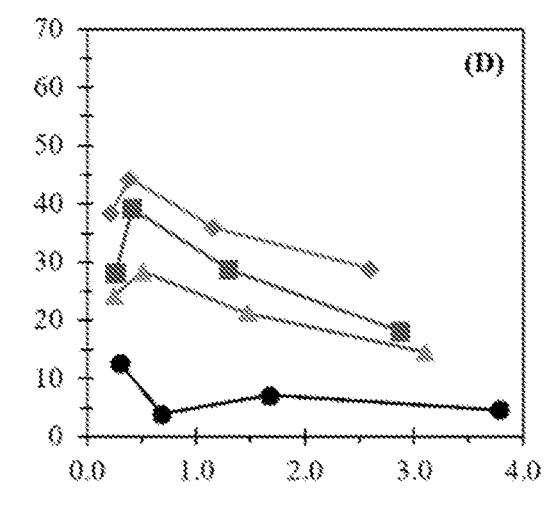
FIG. 15C FIG. 15D

FIG. 16A
FIG. 16B
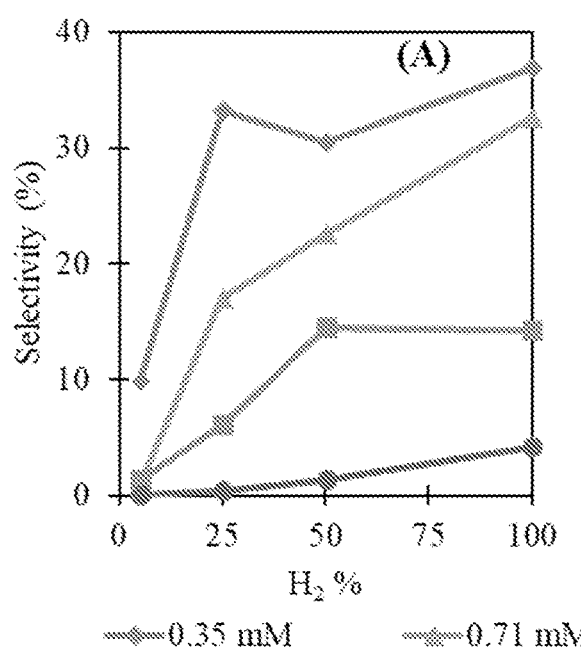
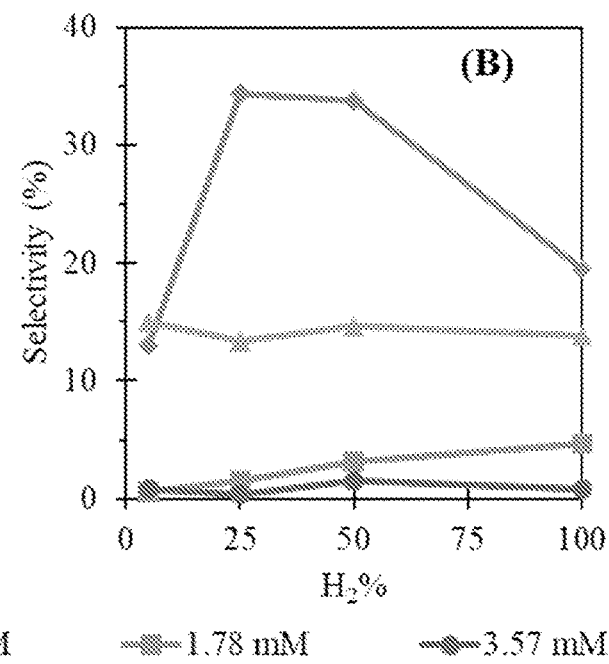
─◆─ 0.35 mM   ─✚─ 0.71 mM   ─■─ 1.78 mM   ─▼─ 3.57 mM FIG. 17A
FIG. 17B
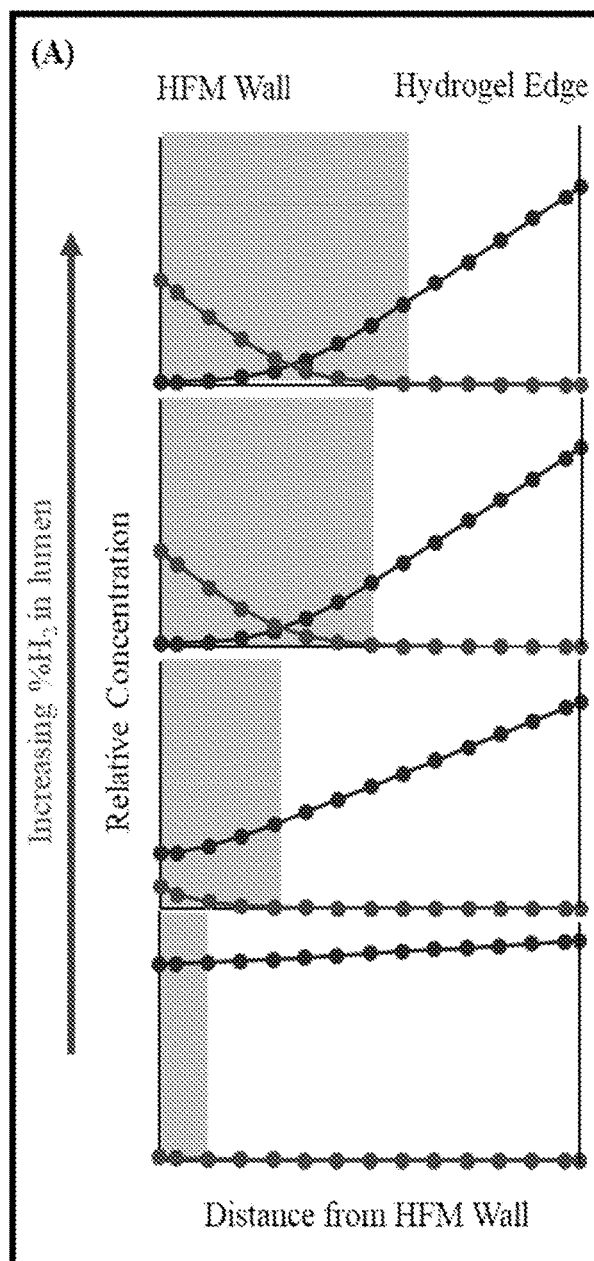
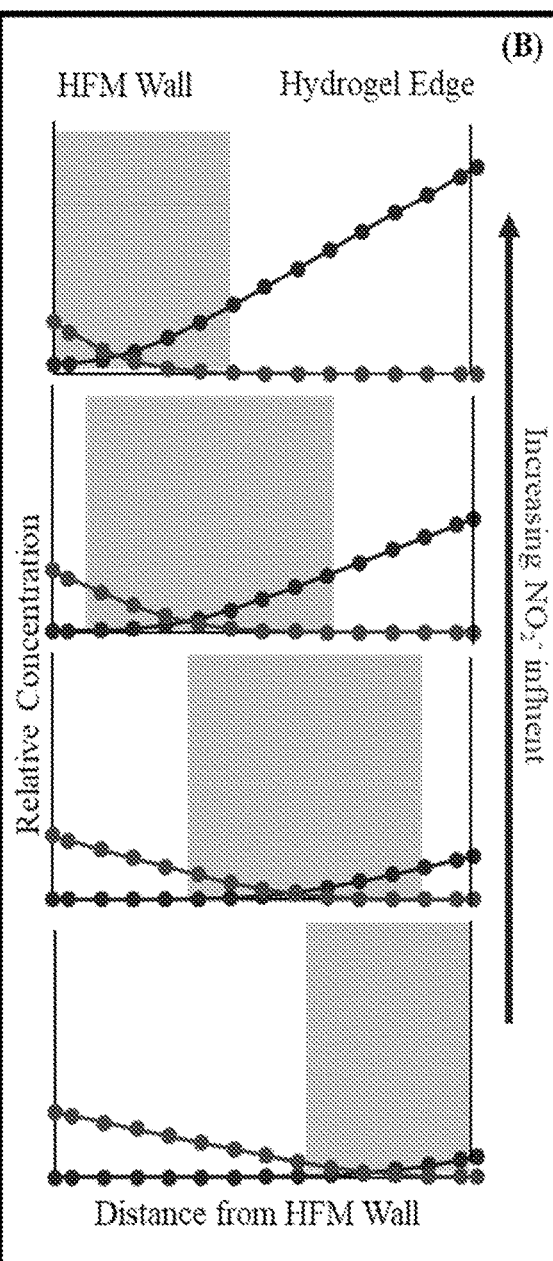

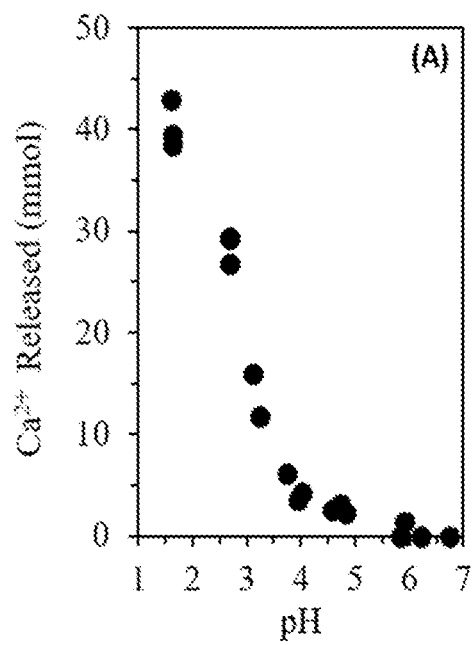
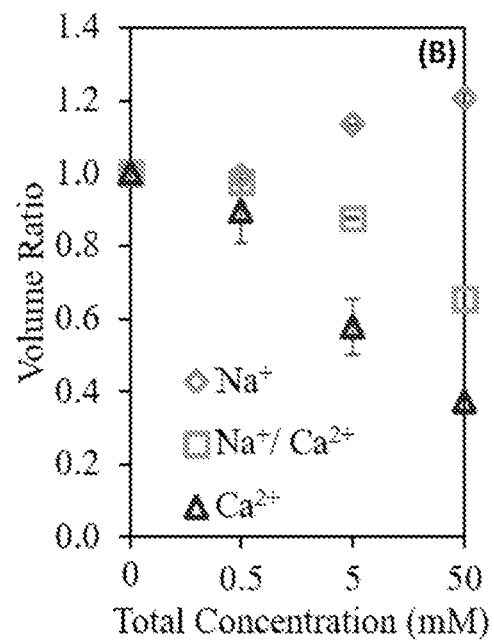
FIG. 20A
FIG. 20B
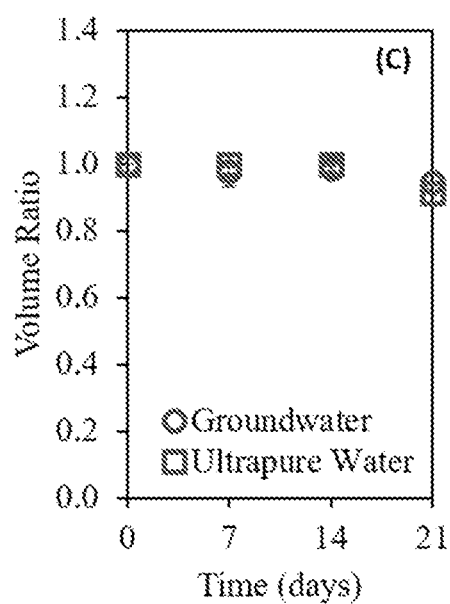
FIG. 20C

CATALYTIC HYDROGEL MEMBRANE REACTOR FOR TREATMENT OF AQUEOUS CONTAMINANTS

CROSS-REFERENCE TO RELATED APPLICATIONS

This application is a U.S. national stage entry of International Patent Application No. PCT/US2019/060613, filed on Nov. 8, 2019, which claims the benefit of and priority to U.S. Provisional Application No. 62/757,545, filed on Nov. 8, 2018, and U.S. Provisional Application No. 62/889,762, filed on Aug. 21, 2019, the entire contents of each of which are hereby incorporated by reference.

STATEMENT OF GOVERNMENT INTEREST

This invention was made with government support under Grant number 1847466 awarded by the National Science Foundation (NSF). The government has certain rights in the invention.

INTRODUCTION

Heterogeneous hydrogenation catalysis (HHC) is a reduction process for treating oxidized contaminants using hydrogen gas ($H_2$). For water treatment applications, target reactions occur at the interface between solid (catalyst), liquid (water), and gas phases. Palladium (Pd) is a catalyst for HHC due to high activity and desirable selectivity. While attempts have been made to replace Pd and other platinum group metals (PGMs) with more earth-abundant materials (e.g., metals sulfides and phosphides), their activities are orders of magnitude lower than PGMs, they are unstable in aqueous environments, and/or they require high operating pressures and temperatures. Although PGMs materials are costly, economic analysis has shown that recent advances in nanotechnology have made PGM catalysts cost competitive compared to other treatment technologies (e.g., ion exchange, air stripping, activated carbon adsorption). However, full-scale HHC implementation has yet to come to fruition due to mass transfer limitations, costs, catalyst instability, and scalability of current treatment options.

Conventional slurry reactors use catalysts that are supported on an inorganic substrate, e.g., activated carbon, alumina, or silica. These supported catalysts are suspended in the aqueous phase and $H_2$ is bubbled directly into the aqueous phase. While simple to operate, this approach suffers from disintegration of powdered catalysts due to particle abrasion during mixing, post filtration requirements, inefficient $H_2$ consumption, and/or $H_2$ safety concerns. Using fixed (or packed) bed catalytic reactors alleviates the need for both rapid stirring of the catalyst solution and post-treatment filtration. For example, the trickle-bed reactor is effective for treating aqueous nitrate, but it has limited reactivity due to $H_2$ solubility limits and poor mass transfer to catalyst surface as well as biofilm fouling during long-term operation.

Three-dimensional interfacial catalytic membranes may be used for immobilized catalyst reactors that allow for a dense loading of nano-sized catalysts and delivers $H_2$ through a counter-diffusional pathway. Membrane-type reactors have previously been demonstrated for hydrogenation reactions using alumina tubular membranes loaded with catalyst particles for $NO_2^-$ reduction; ammonia selectivity was controlled through modification of $H_2$ partial pressure within the reactor. However, such reactors suffer from complex catalyst synthesis procedures, poor control of catalyst loading, and low contaminant reaction rates. Further, the scale-up of known reactors are limited by the challenge of immobilizing the catalyst while maintaining efficient mass transport and reaction kinetics.

Thus, there remain a need for alternative reactors with improved catalyst support that are convenient to prepare and operate, adaptable to a variety reaction, and easily scalable for practical applications.

SUMMARY

In one aspect, the present disclosure provides a catalytic assembly comprising:
- a hollow fiber membrane comprising an inner surface defining a channel and an outer surface, wherein the hollow fiber membrane is permeable to a gas;
- a reactive coating on the outer surface of the hollow fiber membrane, wherein the reactive coating is permeable to the gas and a contaminant; and
- a plurality of catalytic nanoparticles embedded in the reactive coating adapted to catalyze a reaction between the gas and the contaminant.

In another aspect, the present disclosure provides method of preparing a catalytic assembly, comprising:
- inserting a hollow fiber membrane into a first solution comprising alginate, wherein the hollow fiber member comprises an inner surface defining a channel and an outer surface;
- removing the hollow fiber membrane from the first solution, wherein the outer surface of the hollow fiber membrane is at least partially coated with an alginate solution coating;
- inserting the hollow fiber membrane with the alginate solution coating into a second solution comprising $Ca^{2+}$ and $Pd^{2+}$, whereupon the $Ca^{2+}$ reacts with the alginate in the alginate solution coating to form a hydrogel coating on the outer surface of the hollow fiber membrane, wherein the hydrogel coating comprises Ca-crosslinked alginate, and wherein $Pd^{2+}$ ions are dispersed throughout the hydrogel coating; and
- removing the hollow fiber membrane with the hydrogel coating from the second solution and inserting the hollow fiber membrane with the hydrogel coating into a third solution comprising $NaBH_4$, whereupon the $NaBH_4$ reduces the $Pd^{2+}$ ions dispersed throughout the hydrogel coating to form Pd nanoparticles embedded in the hydrogel coating.

In yet another aspect, the present disclosure provides method for water treatment, comprising
- contacting a catalytic assembly as described herein with a volume of water comprising the contaminant, whereupon the contaminant permeates into the reactive coating; and
- flowing the gas through the channel defined by the inner surface of the hollow fiber membrane, whereupon the gas permeates through the hollow fiber membrane into the reactive coating and the catalytic nanoparticles catalyze the reaction between the gas and the contaminant.

BRIEF DESCRIPTION OF THE DRAWINGS

FIG. 2A shows TEM image of Pd nanoparticles isolated from hydrogel support. FIG. 2B shows a histogram of particle diameters measured from TEM images showing a normal distribution. FIG. 2C shows OCT cross-sectional image of hydrogel on HFM. The lower two white lines delineate the HFM wall, with the hydrogel above. FIG. 2D shows SAED pattern of Pd nanoparticles isolated from a CHM.

FIGS. 15A-15E show representative results of $NO_2^-$ hydrogenation kinetic experiments. The Pd-molarity normalized reaction rate (r') over a range of influent $H_2$ percentages (in $N_2$) as a function of effluent $NO_2^-$ (i.e., steady-state) concentrations are presented for a 9.70 mg Pd-loaded CHMR (high loading, FIG. 15A) and a 2.26 mg Pd-loaded CHMR (low loading, FIG. 15B). The $NO_2^-$ conversion for a range of influent $H_2$ percentages (in $N_2$) as a function of effluent $NO_2^-$ concentrations are presented for a 9.70 mg Pd-loaded CHMR (FIG. 15C) and a 2.26 mg Pd-loaded CHMR (FIG. 15D). The legend at the top shows the $H_2$ percentage. FIG. 15E shows r' as a function of (mol-N bar-$H_2$ mol-$Pd^{-1}$). The data was fit with a power-law by a minimizing RSS, with an $R^2$ value of 0.97.

FIGS. 16A and 16B show steady-state $NH_4^+$ selectivity for $NO_2^-$ hydrogenation over a range of initial $NO_2^-$ concentrations and $H_2$ percent mixtures for 9.7 mg Pd-loaded membrane (FIG. 16A) and 2.26 mg Pd-loaded membrane (FIG. 16B).

FIGS. 17A and 17B show a conceptual model of $NO_2^-$ and $H_2$ concentration profiles within a CHM. Concentration of $NO_2^-$ and $H_2$ as a function of position in the catalytic hydrogel is given over a range of conditions. Shaded boxes indicate the position of the RZ within the hydrogel. Beyond the hydrogel edge is the LDL and bulk aqueous regions (not shown). FIG. 17A shows the effect of increased $H_2$% in the lumen while the influent $NO_2^-$ concentration is held constant. FIG. 17B shows the effect of increased $NO_2^-$ concentrations while $H_2$% in the lumen is held constant.

FIGS. 20A-20C show the effects of aqueous phase conditions on the structural stability of the Ca-alginate hydrogel. FIG. 20A shows the quantity of $Ca^{2+}$ released as a function of aqueous phase pH in Ca-alginate hydrogels with no Pd. FIG. 20B shows the mass-ratio of Ca-alginate hydrogel after exposure to increasing total concentrations of monovalent, divalent, and mixed salt solutions. FIG. 20C shows the mass-ratio of hydrogels over a 3-week period of exposure to ultrapure water and model groundwater. The error bars indicate the standard deviation of triplicate trials at the same condition.

DETAILED DESCRIPTION

Figure 1A:
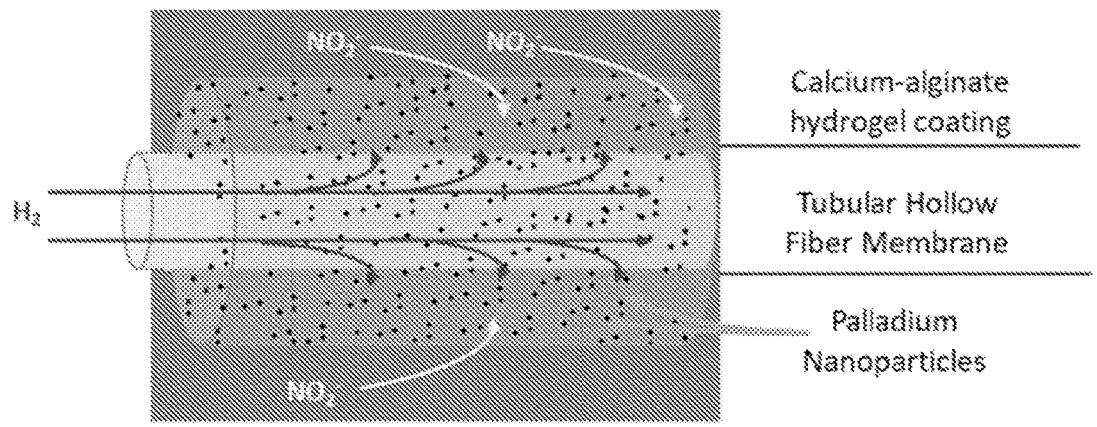
FIG. 1A is a graphic showing a representative catalytic hydrogel membrane unit as described herein.

Disclosed herein are catalytic assemblies having a hollow fiber membrane with a reactive coating and a plurality of catalytic nanoparticles embedded in the coating. For example, the assemblies may include a gas-permeable hollow fiber membrane coated with an alginate-based hydrogel containing catalyst nanoparticles. The catalytic assemblies may be useful for catalyzing an interfacial reaction between a gas that permeates the membrane and the reactive coating and a chemical in a solution. In particular, the assemblies may be useful for decontaminating water by catalyzing the reduction of a variety of contaminants. The assemblies may be incorporated in a catalytic hydrogel membrane reactor, which benefit from counter-diffusional transport within the hydrogel, where the gas (e.g., $H_2$) diffuses from the interior of the membrane and contaminant species (e.g., $NO_2^-$, $O_2$) diffuse from the bulk aqueous solution.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The term "alkane" means a straight or branched chain saturated hydrocarbon. Representative examples of alkane include, but are not limited to, methane, ethane, n-propane, isopropane, n-butane, isobutyl, n-pentane, n-hexane, n-heptane, n-octane, n-nonane, and n-decane.

The term "aromatic compound" means a compound having at least one aromatic group, such as an aryl group or a heteroaryl group.

The term "aryl" as used herein, refers to a phenyl group or a fused aromatic ring system, such as indolyl, naphthyl, quinolinyl, and tetrahydroquinolinyl.

The term "heteroaryl" as used herein, refers to an aromatic monocyclic ring or an aromatic fused ring system, which has at least one heteroatom independently selected from the group consisting of N, O and S.

The term "halogen" means a chlorine, bromine, iodine, or fluorine atom.

The term "contaminant" means to a chemical compound or molecule, or a group of compounds or molecules, present in water or an aqueous solution. The contaminants may include undesired chemical species, such that the use and consumption of water containing such species are deemed to be harmful to an animal, such as a human. For example, the contaminants may include compounds or molecules that are poisonous to a human, cause a disease or disorder in a human, or generally threaten the health of a human.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated 2. Catalytic Assembly In one aspect, the present disclosure provides a catalytic assembly comprising:

a hollow fiber membrane comprising an inner surface defining a channel and an outer surface, wherein the hollow fiber membrane is permeable to a gas;

a reactive coating on the outer surface of the hollow fiber membrane, wherein the reactive coating is permeable to the gas and a contaminant; and a plurality of catalytic nanoparticles embedded in the reactive coating adapted to catalyze a reaction between the gas and the contaminant.

The hollow fiber membrane allows a gas to permeate from one side to the other side of the membrane. The hollow fiber membrane may be arranged, for example, in tubular shape having an inner surface and an outer surface. The inner surface may define a void space, such as a channel, through which a gas may flow. In some embodiments, the hollow fiber membrane is arranged into a tube, the inner surface of which defining a channel, a gas is allowed to flow through the channel at a controllable pressure, and the gas permeates from the inner surface of the membrane to the outer surface of the membrane.

The hollow fiber membrane may include any suitable material that is permeable to a gas and does not interfere with the application of the reactive membrane. In some embodiments, the hollow fiber membrane comprises silicone, such as polydimethylsiloxane. Commercially available materials suitable for the hollow fiber membrane include, for example, the RenaSil™ silicone rubber tubing supplied by Braintree Scientific, Inc (MA).

In some embodiments, the hollow fiber membrane has an outer diameter of about 500 µm to about 2000 µm, including, but not limited to, about 500 µm to about 1500 µm, about 600 µm to about 1200 µm, about 600 µm to about 1000 µm, or about 800 µm to about 1000 µm. In some embodiments, the hollow fiber membrane has an inner diameter of about 250 µm to about 1000 µm, including, but not limited to, about 300 µm to about 1000 µm, about 400 µm to about 1000 µm, about 400 µm to about 800 µm, or about 500 µm to about 800 µm. In some embodiments, the hollow fiber membrane comprises silicone and has an outer diameter of about bout 600 µm to about 1200 µm and an inner diameter of about 400 µm to about 800 µm. In particular embodiments, hollow fiber membrane comprises silicone and has an outer diameter of about bout 800 µm to about 1000 µm and an inner diameter of about 500 µm to about 800 µm.

The reactive coating is applied to the outer surface of the hollow fiber membrane, and it is permeable to a gas and a contaminant in an aqueous solution (e.g., a chemical compound or molecule in water). In general, the reactive coating does not interfere with the reaction between the gas and the contaminant. In some embodiments, the reactive coating comprises a hydrogel. The hydrogel may include a hydrophilic polymer that may be crosslinked to form a three-dimensional structure. In some embodiments, the reactive coating comprises a hydrogel, such as a hydrogel comprising alginate. Suitable hydrogels include, for example, an alginate hydrogel crosslinked by a divalent cation (e.g., $Ca^{2+}$, $Ba^{2+}$, $Sr^{2+}$). Suitable alginate include those having a low, medium, or high viscosity. In some embodiments, the alginate has a low or medium viscosity (e.g., about 40 mPa s to about 2000 mPa s). For example, suitable alginates may include products under CAS Reg. No. 9005-38-3. The source of $Ca^{2+}$ may include, for example, $CaCl_2$, $CaSO_4$, and/or $CaCO_3$.

The reactive coating may have a thickness of about 10 µm to about 2,000 µm. The thickness may be at least 10 µm, at least 50 µm, at least 100 µm, at least 200 µm, at least 500 µm, at least 1,000 µm, at least 1,500 µm, or at least 1,800 µm. The thickness may be less than 2,000 µm, less than 1,800 µm, less than 1,500 µm, less than 1,000 µm, less than 500 µm, less than 200 µm, less than 100 µm, or less than 50 µm. The thickness may be about 10 µm to about 1,000 µm, about 50 µm to about 1,000 µm, about 50 µm to about 500 µm, or about 50 µm to about 200 µm. In some embodiments, the thickness is about 50 µm to about 200 µm, including, for example, about 70 µm, about 90 µm, about 110 µm, about 130 µm, about 150 µm, or about 170 µm. In particular embodiments, the thickness is about 150 µm.

In some embodiments, the catalytic assembly include one or more layers of reactive coatings (e.g., hydrogels), each having a thickness as described herein, with a total thickness less than 2,000 µm, such as less than 1,500 µm or less than 1,000 µm.

The hollow fiber membrane and the reactive coating as described herein are permeable to a gas. In some embodiments, the hollow fiber membrane and the reactive coating are permeable to hydrogen ($H_2$). For example, the gas may be pure $H_2$ or a gas mixture including $H_2$, in which case at least the $H_2$ in the gas mixture permeates the hollow fiber membrane and the reactive coating.

The catalytic nanoparticles include one or more catalysts (such as metal catalysts), which can catalyze a chemical reaction. The catalytic nanoparticles are embedded in the reactive coating (e.g., dispersed homogeneously in a hydrogel coating) and are adapted to catalyze a reaction between a gas (e.g., $H_2$) and a contaminant in an aqueous solution. The gas and contaminant permeate the reactive coating and the reaction between them may take place inside the reactive coating on the surface of the catalytic nanoparticles.

The catalytic nanoparticles have an average particle size of about 1.0 nm to about 10.0 nm. The average particle size may be at least 1.0 nm, at least 2.0 nm, at least 3.0 nm, at least 4.0 nm, at least 5.0 nm, at least 6.0 nm, at least 7.0 nm, at least 8.0 nm, or at least 9.0 nm. The average particle size may be less than 10.0 nm, less than 9.0 nm, less than 8.0 nm, less than 7.0 nm, less than 6.0 nm, less than 5.0 nm, less than 4.0 nm, less than 3.0 nm, or less than 1.0 nm. In some embodiments, the average particle size is about 1.0 nm to about 9.0 nm, about 2.0 nm to about 8.0 nm, about 3.0 nm to about 7.0 nm, or about 3.0 nm to about 6.0 nm. In particular embodiments, the average particle size is about 3.0 nm to about 6.0 nm, including, but not limited to, about 3.5 nm, about 4.0 nm, about 4.5 nm, about 5.0 nm, or about 5.5 nm.

In some embodiments, the nanoparticles can catalyze a hydrogenation reaction. The hydrogenation reaction may be, for example, a reaction between $H_2$ and a contaminant that permeate the reaction coating.

In some embodiments, the catalytic nanoparticle comprises a metal catalyst, such as palladium (Pd), which can catalyze a reaction. In some embodiments, the catalytic nanoparticles include palladium as the catalyst. In some embodiments, the catalytic nanoparticles include palladium and at least one other nonmetal or metal as the catalyst. In some embodiments, the catalytic nanoparticles include palladium and at least one of indium (In) and rhenium (Re). Suitable catalysts also include the Pd-based catalysts disclosed in Chaplin et al., (*Environ. Sci. Technol.,* 2012, 46(7), 3655-3670), which is incorporated herein by reference in its entirety.

In some embodiments, the catalytic assembly include alginate hydrogel as reactive coating and catalytic nanoparticles comprising palladium. In some embodiments, the dry weight ratio of palladium to the alginate is about 1:100 to about 20:100. The dry weight ratio may be at least 1:100, at least 5:100; at least 10:100, at least 15:100, or at least 18:100. The dry weight ratio may be less than 20:100, less than 15:100, less than 10:100, less than 5:100, or less than 2:100. In some embodiments, the dry weight ratio is about 2:100 to about 18:100, about 5:100 to about 18:100, about 5:100 to about 15:100, or about 5:100 to about 10:100. In particular embodiments, the dry weight ratio is about 5:100 to about 10:100, such as 5:100, 6:100, 7:100, 8:100, 9:100, or 10:100.

The contaminant permeating the reactive coating may undergo a reaction that results in reducing the amount of, or eliminating, the contaminant from an aqueous solution. The compound may undergo a reduction reaction catalyzed by the catalytic nanoparticles described herein and be reduced by the gas (e.g., $H_2$) permeating the reactive coating. Without being limited to any theory, it hypothesized that the nanoparticle may catalyzes $H_2$ to form H atoms, which then that react with (e.g., reduce) the contaminant that is on the nanoparticle surface. The reduction reaction may include any reaction that leads to a decrease in the oxidation state of an atom in the contaminant. As non-limiting examples, the reduction reaction may be a hydrodehalogenation reaction, in which at least on halogen atom in a halogenated organic compound is replaced by hydrogen; a hydrodeoxygenation reaction, in which the oxygen atoms in the oxyanion is removed by hydrogenation to water; or an N—N hydrogenolysis reaction, in which the N—N bond in a compound is converted to N—H bonds.

Compounds that may be reduced by a hydrodehalogenation reaction includes, but are not limited to, halogenated alkanes, such as carbon tetrachloride (CT), and 1,2-dichloroethane; halogenated ethylenes, such as dichloroethylene (DCE), trichloroethylene (TCE), and perchloroethene (PCE); halogenated aromatic compounds, such as chlorinated benzenes, polychlorinated biphenyls (PCBs), and chlorinated phenols.

Compounds that may be reduced by a hydrodeoxygenation reaction includes, but are not limited to, nitrate ($NO_3^-$), nitrite ($NO_2^-$), bromate ($BrO_3^-$), chlorite ($ClO_2^-$), chlorate ($ClO_3^-$), perchlorate ($ClO_4^-$). These compounds may have a counterion, such as sodium ($Na^+$) or calcium ($Ca^{2+}$) and other metal ions.

Compounds that may be reduced by an N—N hydrogenolysis reaction includes, but are not limited to, N-nitrosamines, such as N-nitrosodimethylamine (MDMA).

Other compounds capable of undergoing a reaction as described herein include polycyclic aromatic hydrocarbons (PAHs), formate, carbonate, and those disclosed in Chaplin et al. (incorporated herein by reference).

In some embodiments, the compound permeating the reactive coating and reacting with the gas permeating the reactive coating is a halogenated alkane, a halogenated ethylene, a halogenated aromatic compound, a nitrate, a nitrite, a bromate, a chlorite, a chlorate, a perchlorate. In some embodiments, the compound is a nitrate, a nitrite, a bromate, a chlorite, a chlorate, or a perchlorate. In some embodiments, the compound is a nitrate. In some embodiments, the compound is a nitrite.

In some embodiments, the contaminant comprises a halogenated alkane, a halogenated ethylene, a halogenated aromatic compound, a nitrate, a nitrite, a bromate, a chlorite, a chlorate, a perchlorate, or a combination thereof. In some embodiments, the contaminant comprises a nitrate, a nitrite, a bromate, a chlorite, a chlorate, or a perchlorate. In some embodiments, the contaminant comprises a nitrate. In some embodiments, the contaminant comprises a nitrite.

In some embodiments, the catalytic nanoparticles include palladium and the contaminant comprises a nitrite (such as $NaNO_2$). In some embodiments, the catalytic nanoparticles include palladium and indium and the compound comprises a nitrate (such as $NaNO_3$). In some embodiments, the catalytic nanoparticles include palladium and rhenium, and the contaminant comprises a perchlorate (such as $NaClO_4$).

In another aspect, provided is a method of preparing a catalytic assembly as described herein. The preparation method includes:

inserting a hollow fiber membrane into a first solution comprising alginate, wherein the hollow fiber member comprises an inner surface defining a channel and an outer surface;

removing the hollow fiber membrane from the first solution, wherein the outer surface of the hollow fiber membrane is at least partially coated with an alginate solution coating;

inserting the hollow fiber membrane with the alginate solution coating into a second solution comprising $Ca^{2+}$ and $Pd^{2+}$, whereupon the $Ca^{2+}$ reacts with the alginate in the alginate solution coating to form a hydrogel coating on the outer surface of the hollow fiber membrane, wherein the hydrogel coating comprises Ca-crosslinked alginate, and wherein $Pd^{2+}$ ions are dispersed throughout the hydrogel coating; and removing the hollow fiber membrane with the hydrogel coating from the second solution and inserting the hollow fiber membrane with the hydrogel coating into a third solution comprising $NaBH_4$, whereupon the $NaBH_4$ reduces the $Pd^{2+}$ ions dispersed throughout the hydrogel coating to form Pd nanoparticles embedded in the hydrogel coating.

The hollow fiber membrane may include the suitable materials as described herein. In some embodiments, the hollow fiber membrane include silicone. For example, the hollow fiber membrane is a silicone membrane available from a commercial supplier, and it is arranged into a tubular shape having an outer diameter of about 500 μm to about 2000 μm, and an inner diameter of about 250 μm to about 1000 μm.

The first solution provides alginate that can be crosslinked to for a hydrogel. When applied to the outer surface of the hollow fiber membrane, the crosslinded hydrogel forms a coating. In some embodiments, the first solution includes sodium alginate. Suitable sodium alginates include those commercially available products (CAS Reg. No. 9005-38-3), such as those supplied by Chem-Implex International Inc. (IL) (catalog No. 01469). The first solution may be an aqueous solution prepared by dissolving sodium alginate in water at a concentration of about 1 wt % to about 5 wt % (weight sodium alginate/weight water). In some embodiments, the first solution was prepared by dissolve sodium alginate in ultrapure water (18.2 MΩ-cm) at a concentration of about 2 wt %.

The second solution includes $Ca^{2+}$ (such as $CaCl_2$) which causes formation of a crosslinked calcium-alginate hydrogel. Suitable sources of $Pd^{2+}$ include, for example, palladium nitrate, such as palladium nitrate dihydrate (Pd $(NO_3)_2$.$2H_2O$). The second solution may be prepared by dissolving the $Ca^{2+}$ and $Pd^{2+}$ compounds in water to form an aqueous solution. The concentration of $Ca^{2+}$ may be about 50 mM to about 200 mM. The $Ca^{2+}$ concentration may be about 80 mM, about 100 mM, about 120 mM, about 150 mM, or about 180 mM. In some embodiments, the concentration of $Ca^{2+}$ is about 80 mM, about 100 mM, or about 120 mM. The concentration of $Pd^{2+}$ may be in an appropriate range such that the final loading of Pd is about 1.0% to about 12.5% relative to the crosslinked alginate (weight Pd/dry weight of crosslinked alginate). For example, the loading of Pd relative to the crosslinked alginate may be about 5.0%, about 7.5%, or about 10.0%. In particular embodiments, the loading of Pd relative to the crosslinked alginate is about 7.5%.

In some embodiments, the second solution includes $Ca^{2+}$ and at least one other metal ion, such as salts of $Ba^{2+}$ or $Sr^{2+}$.

In some embodiments, the second solution includes $Pd^{2+}$ and at least one other metal capable of catalyzing the reaction as described herein. For example, the second solution may include $Pd^{2+}$ and at least one of indium (In) and rhenium (Re) salts. In some embodiments, the other metals may be applied by contacting the reactive coating (e.g., hydrogel) with a separate solution, whereupon the other metals are transferred into the reactive coating. For example, subsequent to the steps to load Pd nanoparticles into a Ca-crosslinked alginate hydrogel as described herein, the hydrogel may be submerged in a solution containing In and/or Re salts, whereupon the In and/or Re ions diffuse into the coating. The hydrogel loaded with In and/or Re ions may then react with $NaBH_4$ to reduce the ions (e.g., to In/Re).

The third solution include $NaBH_4$, which reduces the $Pd^{2+}$ ions to form Pd nanoparticles embedded in the hydrogel coating. The third solution may be prepared by dissolving NaBH4 in water to form an aqueous solution at a concentration of about 1.0 mM to about 5 mM.

The catalytic assembly prepared by the method described herein may be stored in ultrapure water until use.

3. Method

The present disclosure provides a novel type of heterogeneous hydrogenation catalysis (HHC) architecture that includes a catalytic hydrogel membrane (CHM) reactor (FIG. 1A). The CHM may include, for example, a gas-permeable hollow-fiber membrane (HFM) coated with an alginate-based hydrogel containing catalyst nanoparticles. The CHM operates using counter-diffusional transport of reactive species within the hydrogel, where a gas (e.g., $H_2$) diffuses from the interior of the membrane and dissolved target species (e.g., a dissolved contaminant) diffuse from the bulk aqueous solution. Counter-diffusional delivery of $H_2$ reduces consumption of $H_2$ and allows the reaction to be "tuned" towards desired by-products. The CHM reactor is the first to use hydrogels for catalyst immobilization in conjunction with counter-diffusional membrane techniques. In particular embodiments, a CHM device is developed with a catalyst (Pd) and contaminants (e.g., $NO_2^-$). Specifically, the present disclosure (i) develops and physically characterizes a CHM with Pd nanoparticle catalysts, (ii) investigates the counter-diffusional behavior of the CHM using $O_2$ as a model contaminant, (iii) provides a proof-of-concept study assessing the reduction of a water contaminant, $NO_2^-$, as a function of Pd loading, (iv) demonstrates the effects of $H_2$ delivery mode and mass transport limitations on the activity and by-product selectivity of $NO_2^-$ reduction, and (v) establishes the short-term stability of the CHM reactor for reduction of $NO_2^-$ over a three-day period.

In another aspect, provided is a method for water treatment, comprising:
  contacting a catalytic assembly as described herein with a volume of water comprising a contaminant, whereupon the contaminant permeates into the reactive coating; and
  flowing the gas through the channel defined by the inner surface of the hollow fiber membrane, whereupon the gas permeates through the hollow fiber membrane into the reactive coating and the catalytic nanoparticles catalyze the reaction between the gas and the contaminant.

In some embodiments, the water has a pH between about 4.0 and about 9.0. The pH may be at least 4.0, at least 5.0, at least 6.0, at least 7.0, or at least 8.0. The pH may less than 9.0, less than 8.0, less than 7.0, less than 6.0, or less than 5.0. The pH may about 4.5 to about 8.5, about 4.5 to about 8.0, about 4.5 to about 7.5, about 4.5 to about 7.0, or about 4.5 to about 6.0. In some embodiments, the method described herein may be conducted under acidic condition (pH 7.0 or less) without dissolving the hydrogel. For example, the pH may be about 4.5 or even lower while the hydrogel structure is maintained. In particular embodiments, the pH is about 4.5 to about 6.0.

The water may include any contaminant as described herein, or combinations thereof. In some embodiments, the concentrations of the contaminant is about 0.01 mM to about 2.0 mM, including, but not limited to about 0.05 mM, about 0.1 mM, about 0.15 mM, about 0.2 mM, about 0.5 mM, about 0.8 mM, about 1.0 mM, about 1.2 mM, about 1.5 mM, about 1.8 mM, or about 2.0 mM.

In some embodiments, the reactive membrane has a thickness between about 10 μm and about 2,000 μm as described herein. The thickness may be about 10 μm to about 1,000 μm, about 50 μm to about 1,000 μm, about 50 μm to about 500 μm, or about 50 μm to about 200 μm. In some embodiments, the thickness is about 50 μm to about 200 μm, including, for example, about 70 μm, about 90 μm, about 110 μm, about 130 μm, about 150 μm, or about 170 μm. In particular embodiments, the thickness is about 150 μm.

In some embodiments, the gas is hydrogen. In the some embodiments, the gas is hydrogen at a pressure of about 1.0 psi to about 5.0 psi. The pressure may be at least 1.0 psi, at least 2.0 psi, at least 3.0 psi, or at least 4.0 psi. The pressure may be less than 5.0 psi, less than 4.0 psi, less than 3.0 psi, or less than 2.0 psi. The pressure may be about 1.0 psi to about 4.5 psi, about 2.0 psi to about 4.5 psi, about 2.0 psi to about 4.0 psi, or about 2.0 psi to about 3.5 psi. In some embodiments, the pressure is about 2.0 psi to about 4.0 psi, such as about 2.5 psi, about 3.0 psi, or about 3.5 psi. In particular embodiments, the pressure is about 3.0 psi.

In some embodiments, the catalytic nanoparticles include palladium. In some embodiments, the catalytic nanoparticles include palladium and at least one other metal capable of catalyzing the reaction as described herein. For example, the second solution may include palladium and at least one of indium and rhenium.

EXAMPLES

Example 1 Preparation of Catalytic Hydrogel Membrane (CHM)

Figure 1B:
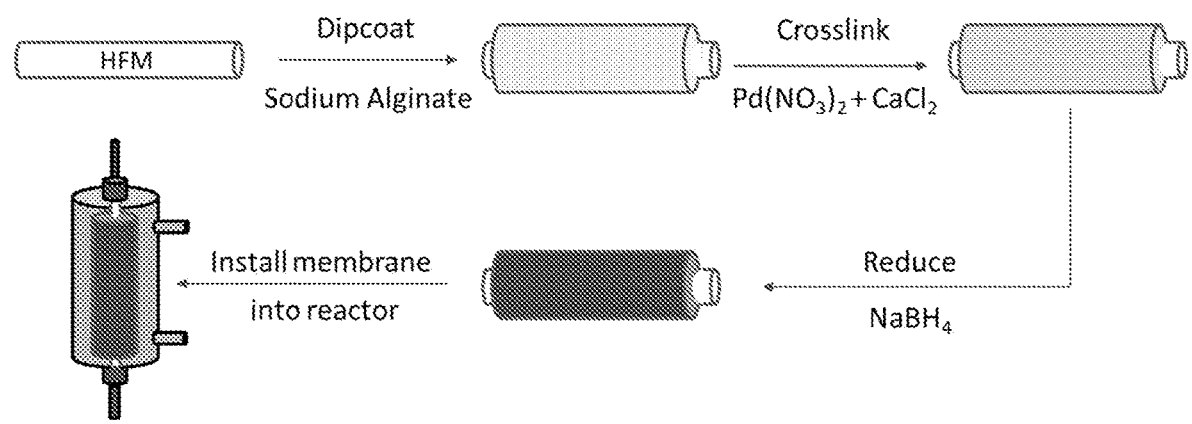
FIG. 1B shows a representative preparation process for catalytic hydrogel film on a hollow fiber membrane (HFM). A clean HFM is dipped in an aqueous solution of sodium alginate, then rapidly transferred to a solution of $Pd(NO_3)_2$ and $CaCl_2$) to cross-link. After cross-linking is complete, Pd2+ ions are reduced in a sodium borohydride ($NaBH_4$) solution to form Pd nanoparticles. The coated membrane is then installed in a glass reactor for hydrogenation catalysis experiments.

A representative CHM including a gas-permeable hollow fiber membrane (HFM) coated with an alginate-based hydrogel containing catalyst nanoparticles was prepared using a method involving in-situ reduction of $Pd^{2+}$ ions enmeshed in the hydrogel (FIG. 1B). Briefly, 2 wt % (weight of alginate/weight of water) alginic acid sodium salt (low viscosity, #01469, Chem-Implex Inc.) was dissolved in ultrapure water (18.2 MΩ-cm) with stirring until homogeneity was achieved. The alginate solution was transferred to a custom-built half-tube reactor for coating. A 25-cm length of the silicone HFM (0.037" OD×0.025" ID, #025BRA002, Braintree Scientific, Saint Gobain) was completely submerged in the alginate solution. A 20-mL cross-linking solution (100 mM total concentration) was prepared by dissolving calcium chloride ($CaCl_2$, anhydrous, #C77, Fisher Scientific) and palladium nitrate dihydrate (Pd$(NO_3)_2 \cdot 2H_2O$, #76070, Sigma Aldrich) in aqueous solution, which was then poured into a separate half-tube reactor. The alginate-coated membrane was removed from the alginate solution and rapidly transferred to the $Ca^{2+}/Pd^{2+}$ cross-linking solution. The membrane was soaked in the cross-linking solution for 30 min to allow for complete crosslinking. The resulting Ca-alginate hydrogel had a vibrant orange color from $Pd^{2+}$ intrusion. The alginate coating and cross-link procedure was repeated once to increase the hydrogel thickness and stability. Subsequently, the reduction of the embedded $Pd^{2+}$ to Pd nanoparticles was induced by submerging the membranes in 2.5 mM sodium borohydride ($NaBH_4$, 98%, #13432, Alfa-Aesar), during which the hydrogel turned a dark gray color. The completed catalytic hydrogel membrane was stored in ultrapure water until use.

Materials Characterization of the CHM Optical Coherence Tomography (OCT; Ganymede II Spectral Domain OCT System, THORLABS, Inc.) was used to obtain optical 2D sections of the internal structure of the catalytic hydrogel while submerged in ultrapure water. Pd nanoparticles were extracted from the hydrogel by dissolving it in a solution of ethylenediaminetetraacetic acid (0.1 M) and sodium citrate (0.2 M). The isolated particles were then centrifugally washed and resuspended in ethanol. A drop of this solution was added to a transmission electron microscopy (TEM) grid, dried, and then analyzed by TEM (Titan 80-300, 300 kV) to obtain the primary particle size. The Pd crystal structure was characterized using selected area electron diffraction (SAED). The total Pd mass loading in each CHM was determined using inductively coupled plasma-optical emission spectroscopy (ICP-OES; Perkin-Elmer Optima 8000). To prepare the samples for ICP-OES, the hydrogel was first stripped from the HFM, dried in air at room temperature overnight, massed, and then digested in concentrated nitric acid (68%, redistilled, GFS) using microwave digestion (210° C. for 45 min, 110 mL MarsXpress vessel, Mars6 Microwave Digester).

Figure 2A:
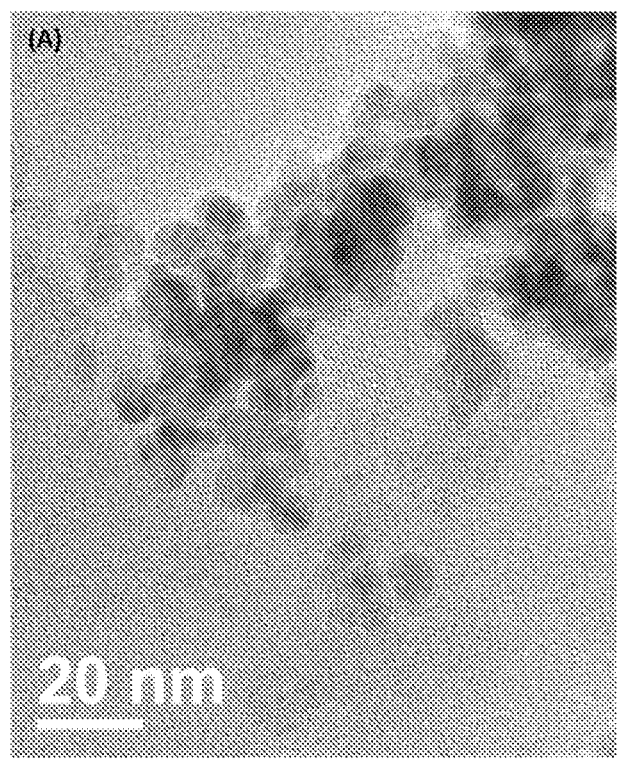
FIGS. 2A-2D show representative results of characterization of a catalytic hydrogel membrane (CHM).
Figure 2B:
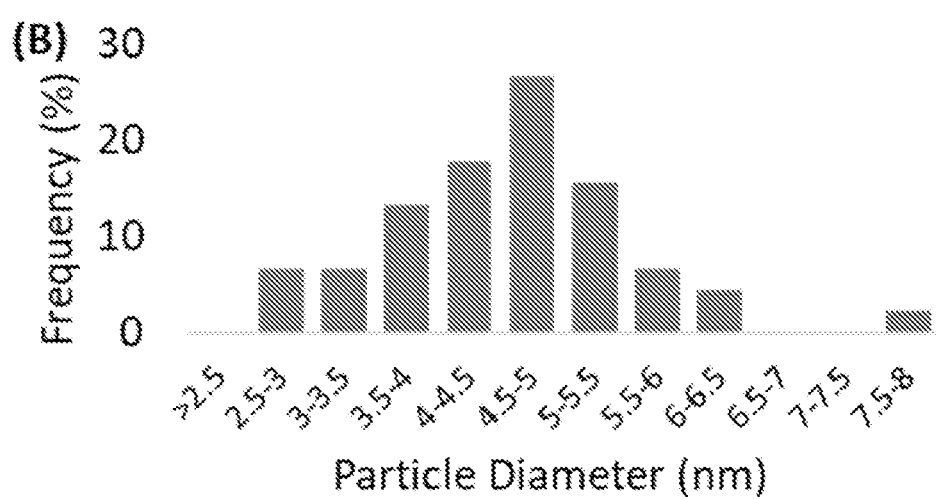
Figure 2C:
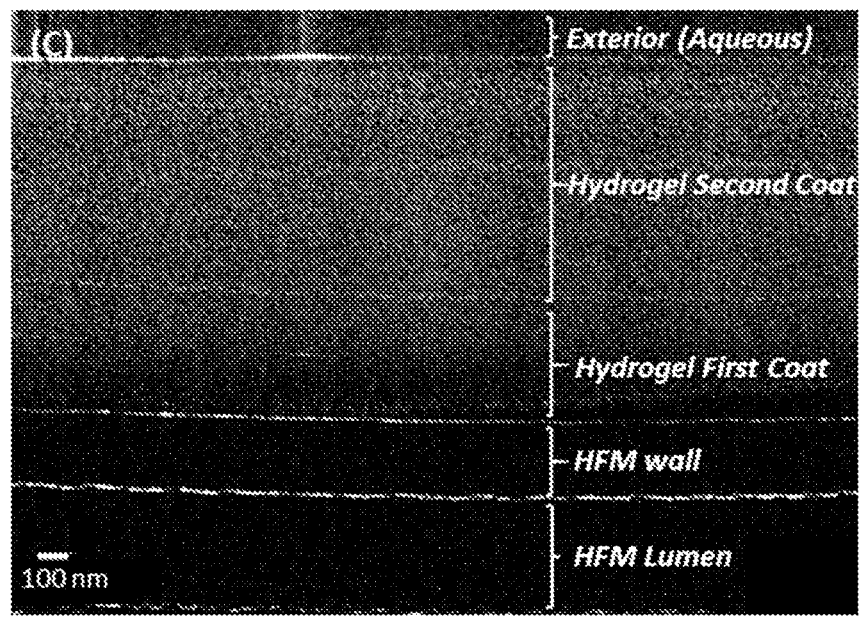
Figure 2D:
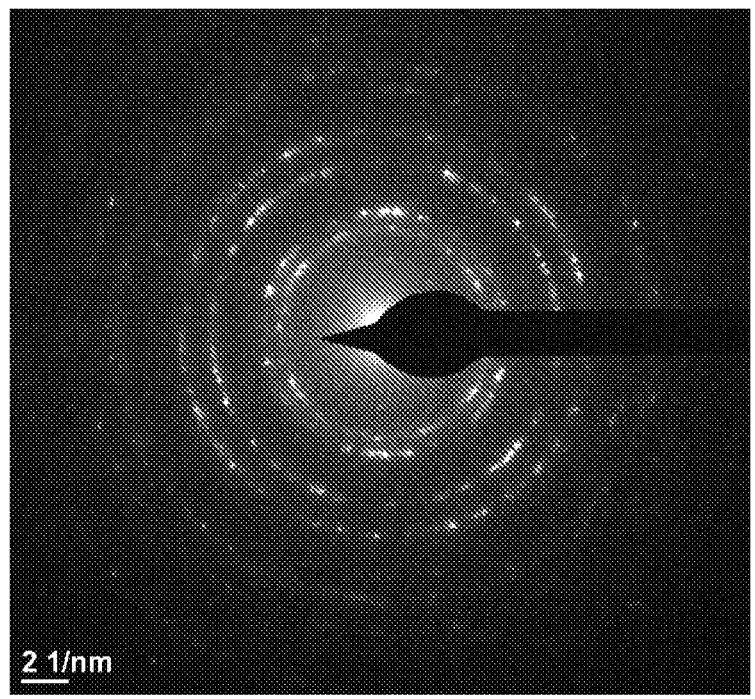

As observed in the TEM micrographs (FIG. 2A), the average primary particle size of the Pd particles was 4.59±1.02 nm (FIG. 2B). SAED analysis revealed the presence of numerous Pd facets, including the [111], [200], [220], [311], and [300] (FIG. 2D). Using the TEM micrographs, an average d-spacing of 0.23 nm was measured, which matches the [111] crystal facet for Pd and indicates it is the dominate facet.

The color of the hydrogel of the CHM was dark grey and consistent throughout with no visible particles or aggregates. OCT images (FIG. 2C) confirmed uniform dispersion of the Pd particles as no large aggregates were observed, and they showed the mean thickness of the hydrogel for a single-layer and double-layer coated HFM was 304±37 μm and 988±119 μm, respectively. Longitudinal uniformity of Pd was investigated by analyzing the Pd-loading for 10 equivalent 2.5 cm segments of a single CHM. The Pd-loading was found to be consistent with an average Pd mass of 0.184±0.0206 mg for one segment. With regards to the hydrogel film stability (i.e., adherence to the HFM and consistency within the gel), Pd-loadings greater than a theoretical Pd wt./dry alginate wt. of 12.5% resulted in stability loss for the alginate viscosity/concentration used herein. The stability loss was presumably due to the decrease of alginate cross-linking sites as $Pd^{2+}$ was reduced to $Pd^0$. Consequently, 12.5% theoretical Pd wt./dry alginate wt. was the maximum loading used in this study.

Example 2 Preparation of Catalytic Hydrogel Membrane Reactor (CHMR)

Figure 3A:
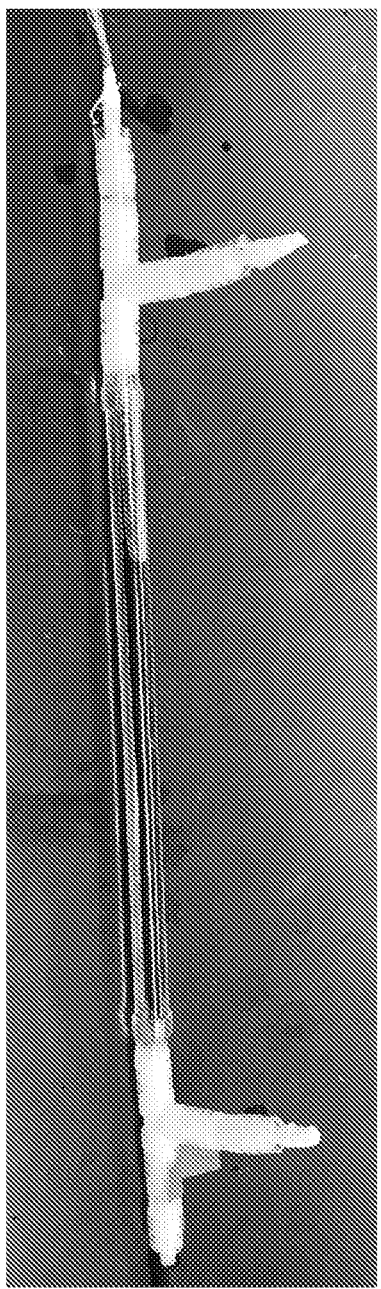
FIG. 3A shows a representative 8-membrane reactor assembly.
Figure 3B:
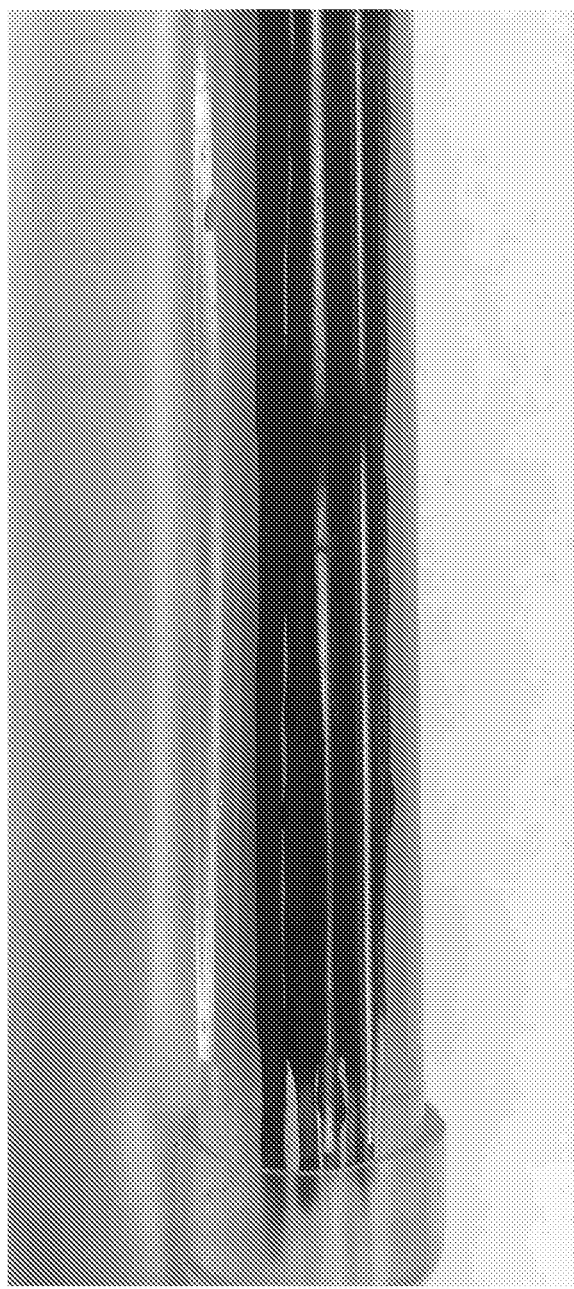
FIG. 3B shows a close-up view of individual CHMs installed into the membrane reactor assembly.

Representative CHMR assembly was constructed by installing CHM of Example 1 in a tubular glass reactor with ports for aqueous and gaseous supplies (FIGS. 3A and 3B). To construct a multifiber CHMR, eight catalytic hydrogel membrane (CHM) strands were inserted in a 25-cm long plastic tube with an inner diameter of 1.27 cm. Plastic T-connectors were installed on both ends of the tubing and the uncoated HFM ends of the CHMs were fixed in place with adhesive (urethane, #2RUD4, Grainger) to create a water-tight seal. Special care was taken to ensure the HFM openings were not crimped or sealed.

Example 3. Nitrite Hydrogenation Using CHMR

Figure 4A:
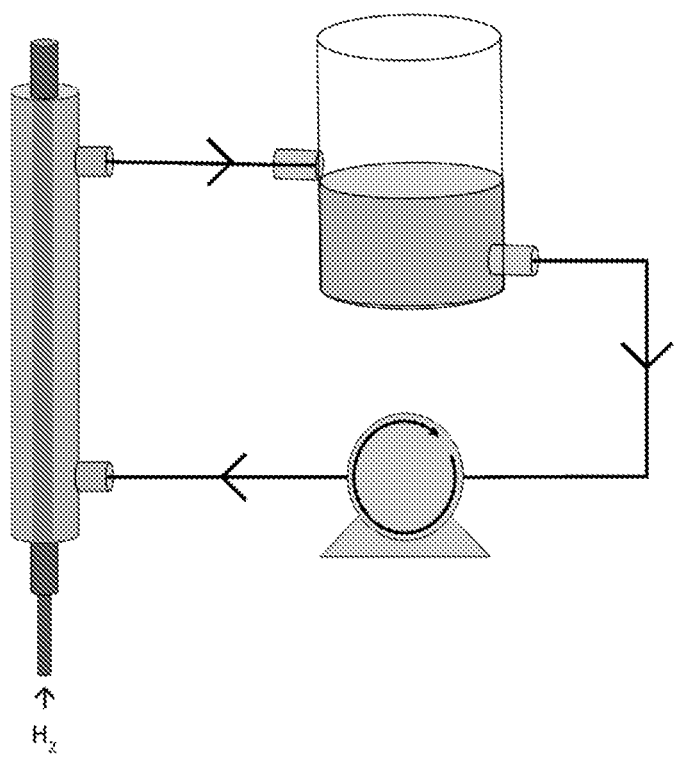
FIG. 4A shows a schematic of a reactor assembly for batch-recycle nitrite hydrogenation experiments.

The CHM was installed in a tubular glass reactor with ports for aqueous and gaseous supplies, which formed the CHM reactor assembly (FIG. 4A). The aqueous solution was composed of ultrapure water (18.2 MΩ-cm) and 0.35 mM of sodium nitrite ($NaNO_2$, reagent grade, #0535, VWR). For all counter-diffusional experiments, 100% $H_2$ (ultra-high purity, #HY UHPT, American Gas and Welding) was supplied through the lumen of the HFM (operated in closed mode, constant lumen pressure of 3 psi). The majority of experiments were conducted in a recirculating batch system, where the aqueous solution (volume=60 mL) was recycled along the exterior of the CHM using a peristaltic pump. A single experiment using groundwater was conducted using a completely mixed flow reactor consisting of eight CHMs bundled.

Figure 4B:
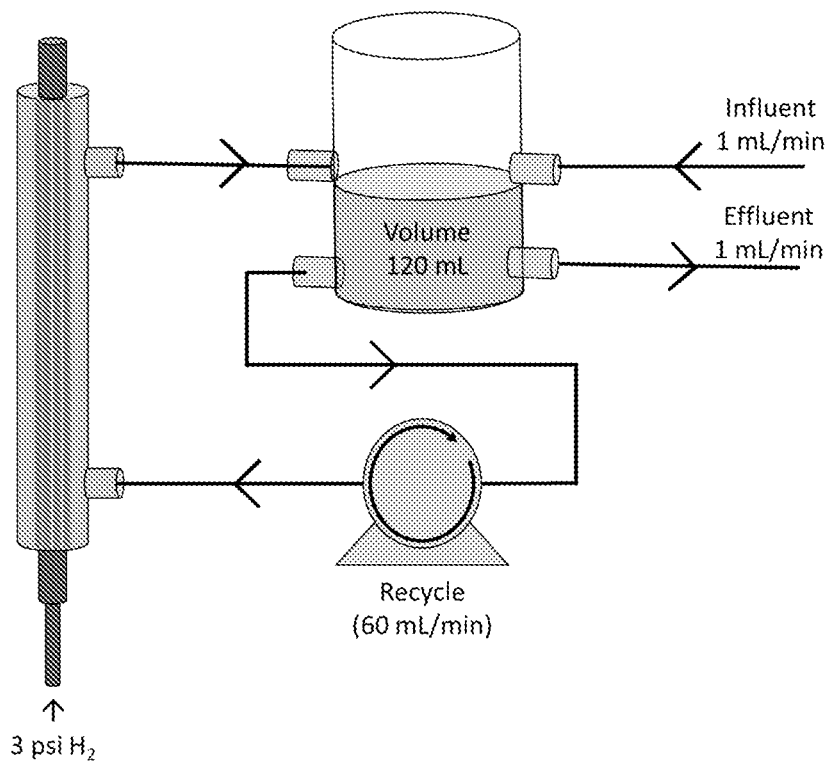
FIG. 4B shows a schematic of a reactor configuration for continuous-recycle nitrite hydrogenation including eight HFM strands in reactor.

A completely mixed flow reactor was assembled by bundling eight CHMs (7.5% theoretical Pd wt./dry alginate wt.) in a single reactor vessel (FIG. 4B). The total volume of the reactor was 120 mL, and the influent/effluent flow rate was 1 mL/min. The reservoir volume was recycled through the reactor at a rate of 60 mL/min to ensure that the reaction volume was well-mixed. 100% $H_2$ was supplied to the lumen at 3 psi in closed mode. The reactor was operated continuously over a period of three days and reached steady-state within 6 hours. Samples were taken semi-regularly for analysis of $NO_2^-$, $NO_3^-$, and $NH_4^+$ by ion chromatography. The aqueous solution consisted of groundwater taken from a well system, which was spiked with $NaNO_2$ to a concentration of 1.5 mmol/L. The groundwater species concentrations are shown in Table 1. After 3 days of operation, the reactor was disassembled and the Pd loading was measured for each strand used in the reactor by microwave digestion and ICP-OES. During hydrogenation experiments, bulk aqueous aliquots were removed periodically for subsequent analysis of $NO_2^-$ and $NH_4^+$ by ion chromatography (IC; Dionex ICS 5000+; AS-23 and CS-12A analytical columns). The sole by-products were assumed to be $N_2$ and $NH_4^+$, so $N_2$ formation was calculated from the mass balance between measured $NO_2^-$ and formed $NH_4^+$.

TABLE 1

Water quality parameters for well water spiked with 1.5 mM $NaNO_2$

| Species | Concentration (mg/L) |
|---|---|
| ammonia | ND |
| nitrate | ND |
| Nitrite | 69.7 |
| total alkalinity * | 131 |
| total organic carbon | 2.29 |
| chloride | 120 |
| sulfate | 51.2 |
| sodium | 102 |
| potassium | 2.66 |
| magnesium | 30.2 |
| calcium | 109 |

* as mg/L $CaCO_3$

Figure 5A:
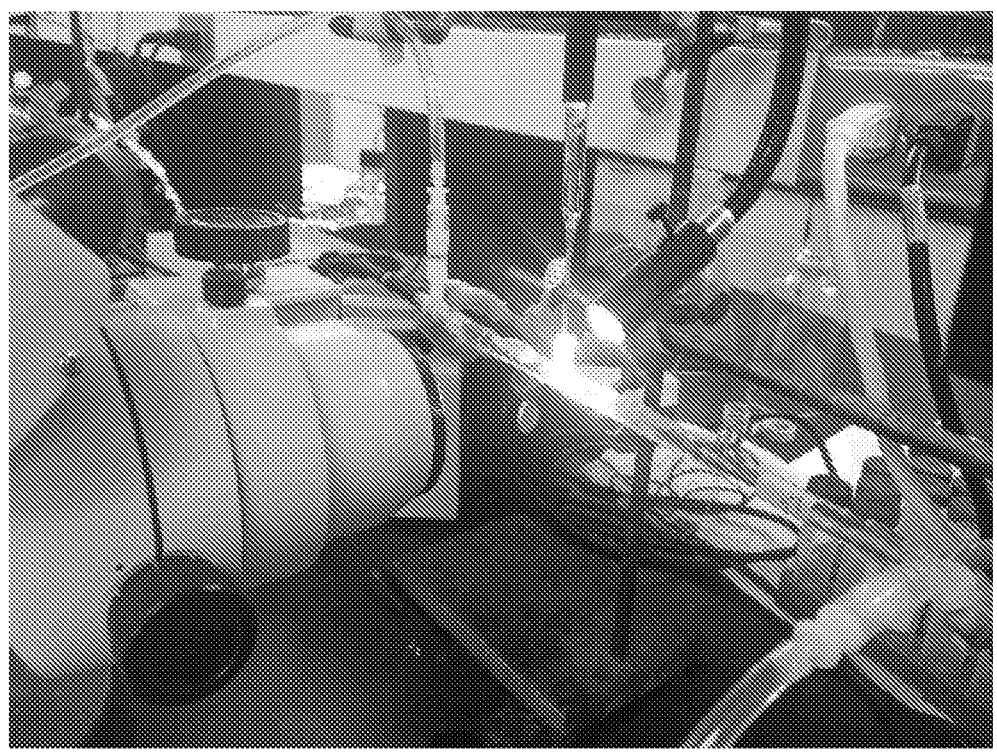
FIG. 5A shows a photograph of microsensor analysis of $O_2$ concentrations. Microsensor (glass needle) is inserted into reactor containing CHM. The site of insertion is illuminated and the microsensor position, controlled by a micro-manipulator, is observed using the optical microscope in foreground.
Figure 5B:
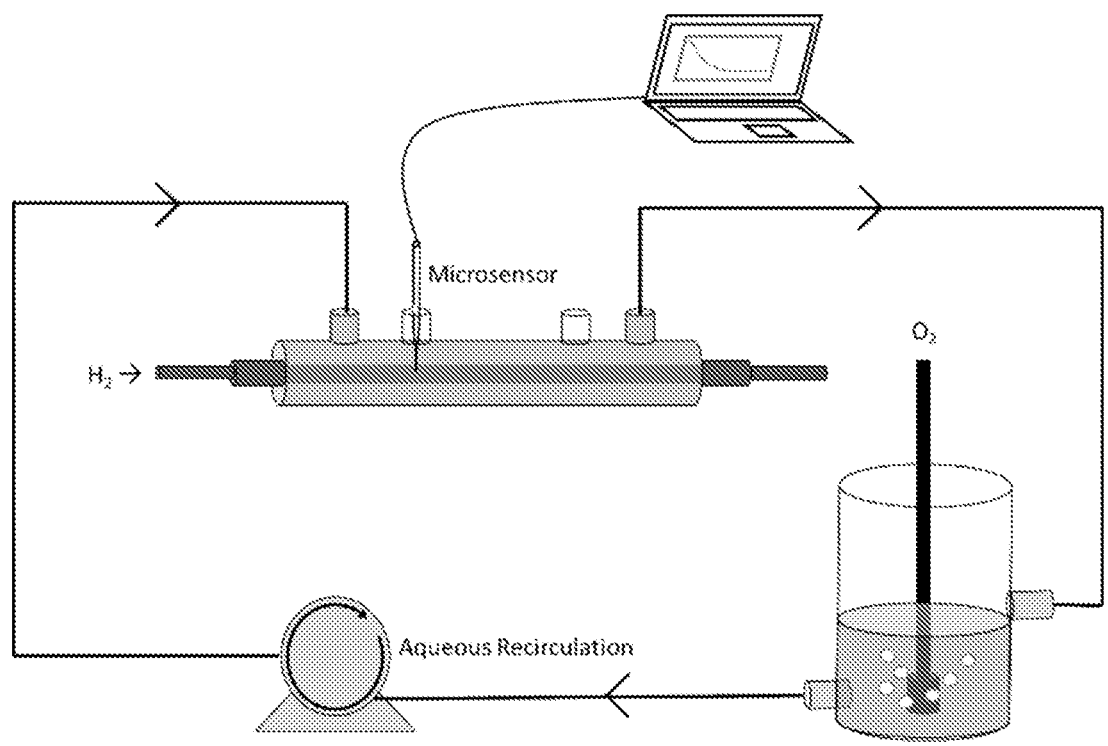
FIG. 5B shows a configuration of a steady-state reactor assembly for microsensor analysis.

Microsensor Analysis of Concentration Profiles To measure the concentration profiles of dissolved species $O_2$ and $H_2$ during catalytic $O_2$ reduction, a single-coated CHM was installed in a custom-built tubular glass reactor (6-mm inner diameter and 25-cm length) containing two ports for microsensor measurements (FIGS. 5A and 5B). During operation, 100% $H_2$ (ultra-high purity, #HY UHPT, American Gas and Welding) was supplied through the lumen of the HFM (open mode, 1 psi), while 100% $O_2$ (ultra-high purity, #OX UHPT, American Gas and Welding) was constantly bubbled into the aqueous reservoir to achieve a high dissolved $O_2$ concentration. The aqueous solution was recycled through the reactor at a flow velocity of 2.7 cm s$^{-1}$. Prior to analysis the system was operated for 0.5 hr to obtain steady-state conditions. As a control, in separate experiments, 100% $N_2$ (high purity, #NI-300-HP, American Gas and Welding) was bubbled either into the lumen or the aqueous solution.

$H_2$ and $O_2$ microscale electrodes, or microsensors, with a 25-μm tip diameter (H2-25 and OX-25, Unisense A/S, Denmark) were used to measure the dissolved $H_2$ and $O_2$ profiles within the catalytic hydrogel. Microsensors were calibrated according to manufacturer's instructions, and data was collected using Unisense Logger 2.7 software. The microsensors, controlled with a motorized micro-manipulator (Model MC-232 and MM33, Unisense A/S), were inserted into the catalytic hydrogel perpendicular to the membrane until contact was established with the outer wall of the HFM. Measurements of species concentrations were then taken at 20-μm intervals as the microsensors were withdrawn through the hydrogel. Measurements were continued another 400 μm into the bulk aqueous layer. The total measurement time for each profile was approximately 5 minutes.

The effects of counter-diffusional delivery of $H_2$ and the reactant on CHM behavior were studied. Microsensor analysis was used to map the concentration profiles of relevant species during hydrogenation. CHMs provide a unique opportunity for the direct observation of concentration profiles within the catalyst support. Pd is known to catalyze the reduction of $O_2$ in the presence of $H_2$ and it was used as a model reaction because the reactants can be measured by commercially available microsensors and steady-state conditions of the reaction are easily maintained within the CHM.

Figure 6:
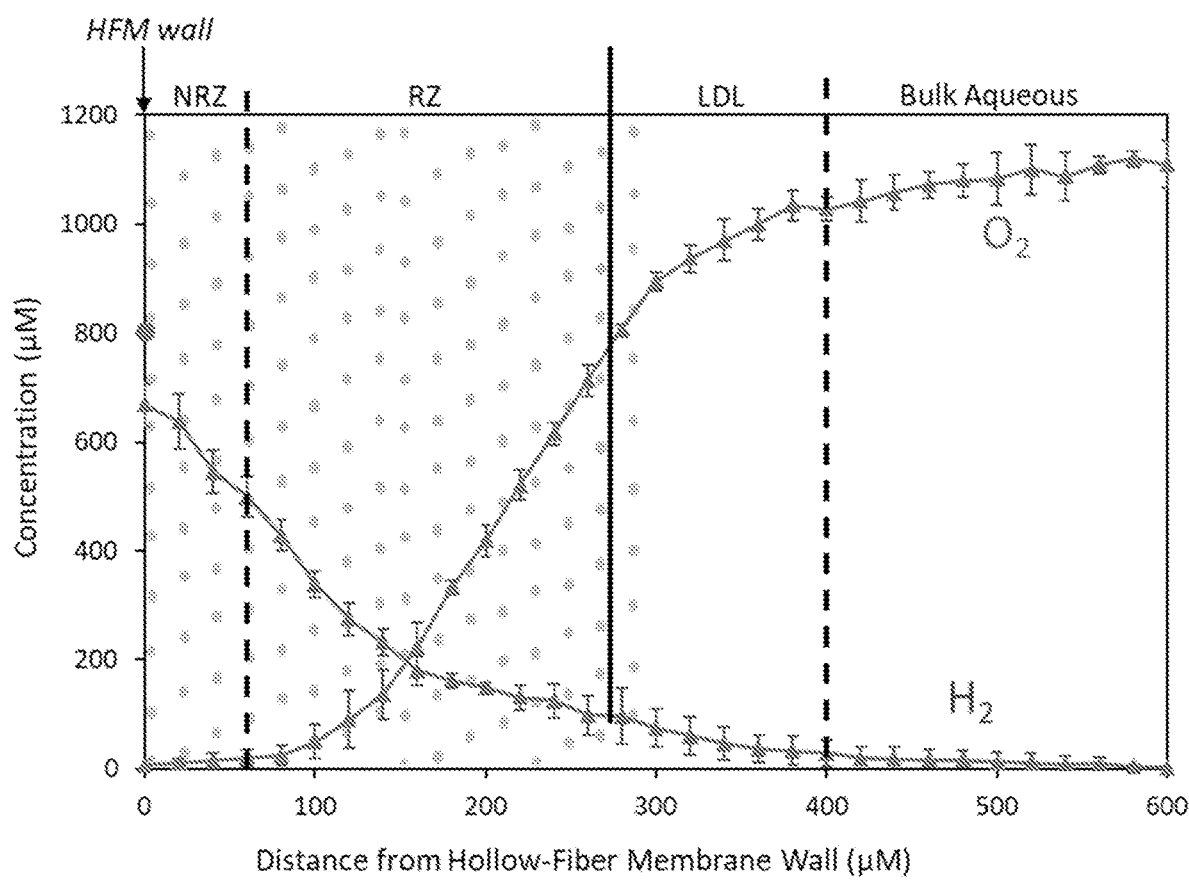
FIG. 6 shows Concentration profiles of $O_2$ and $H_2$ during catalytic reduction of $O_2$ by a CHM as measured by microsensors. $H_2$ diffuses out of the HFM wall (left-side) and through the hydrogel (dotted region), while $O_2$ passes from the aqueous region (right-side) through the hydrogel. Reaction of $H_2$ and $O_2$ at catalytic sites results in the formation of distinct regions given at top of figure. NRZ: non-reactive zone, RZ: reactive zone, LDL: liquid diffusion layer. Dashed lines indicate estimated transition points between these regions and the solid line indicates the outer edge of catalytic hydrogel. The dot at the HFM wall represents the saturation concentration of $H_2$ at room temperature, which is not achieved in the system due to mass transfer limitations on $H_2$ diffusion through the HFM wall.

The concentration profiles of $O_2$ and $H_2$ in a CHM as measured by the microsensor are shown in FIG. 6. These profiles illustrate the concentrations of each species through the depth of the hydrogel and into the bulk aqueous zone. Distinct regions within the reactor were observed: the bulk aqueous region, the liquid diffusion layer (LDL), the reactive zone (RZ) of the hydrogel, and the non-reactive zone (NRZ) of the hydrogel. This bulk aqueous region is dominated by the flow of water parallel to the membrane and maintains a high oxygen concentration due to rapid recirculation of oxygenated water (e.g., 2.7 cm s$^{-1}$) from the reservoir, while the bulk $H_2$ concentrations approached zero. At the LDL (the interface between the hydrogel and the bulk aqueous region where diffusion is the dominant mechanism of mass transfer), aqueous species concentrations vary in a linear fashion per Fick's First Law of diffusion. The position of the inner edge of the LDL was determined through visual observation of the microsensor exiting the hydrogel, while the outer edge was determined empirically by evaluation of the position of the change in slope of the $O_2$ concentration gradient. LDL thickness was found to be approximately 100 μm under the tested conditions. After diffusion through the LDL, $O_2$ reaches the hydrogel surface. The exterior region of the hydrogel closest to the LDL is the RZ, where $H_2$ and $O_2$ are reacting at catalyst sites. In this region, component concentrations profiles follow a typical diffusion-reaction shape as transport is controlled by both diffusion and catalyst-surface reaction rates. Finally, the interior region of the hydrogel closest to the HFM is the NRZ, where $O_2$ has been depleted and no further reaction is occurring. In this region, $H_2$ transport from the membrane wall is dominated by diffusion. The locations of the RZ and NRZ vary depending on the $H_2$ and $O_2$ concentrations at the hydrogel boundaries, the catalyst density and activity, and the overall hydrogel thickness.

Figure 7:
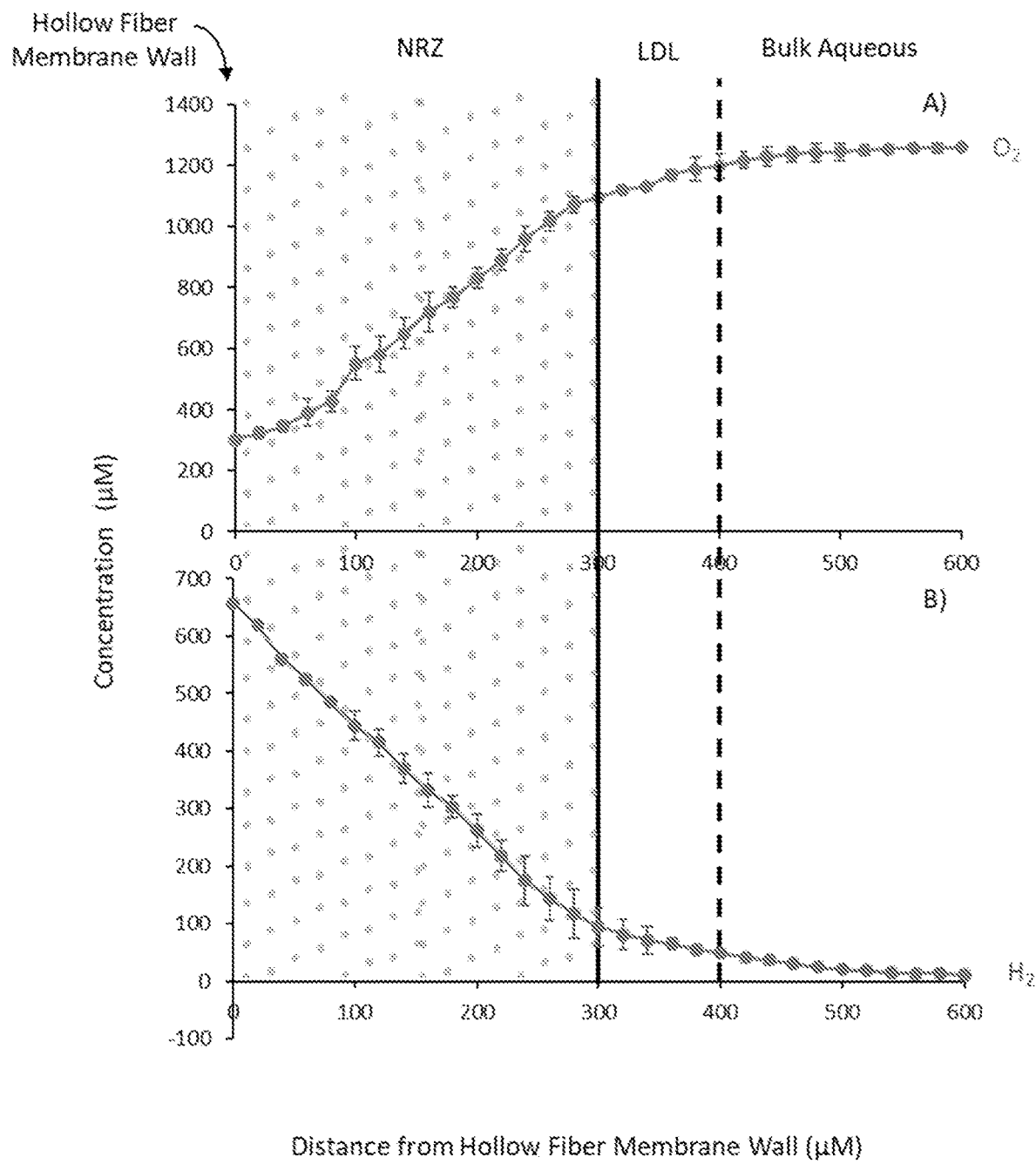
FIGS. 7A and 7B shows microsensor profiles of $O_2$ (FIG. 7A) and B) $H_2$ (FIG. 7B) under inert conditions. $O_2$ measurements were taken with $N_2$ in the HFM lumen. $H_2$ measurements were taken with $N_2$ rapidly bubbling into the aqueous reservoir to displace $O_2$.

The transport of $H_2$ and $O_2$ was further investigated by measuring their respective profiles separately replacing $H_2$ or $O_2$ with $N_2$, allowing their transport to be governed by diffusion only (FIG. 7). According to conservation of flux, diffusivity of a species within the hydrogel can be determined from the difference in the concentration gradient between the hydrogel and the LDL (Table 2). The measured concentration gradients were used to determine effective diffusivities of $O_2$ and $H_2$ in the CHM, which were 6.2×10$^{-6}$ and 11.0×10$^{-6}$ cm$^2$ s$^{-1}$, respectively. These effective diffusivities are approximately 25% of their aqueous diffusivities, indicating the alginate matrix does hinder diffusion. The diffusivity of dissolved $O_2$ in the CHM is greater than reported for other common supports, such as alumina (3.2× 10$^{-6}$ cm$^2$/s) and activated carbon (0.58×10$^{-6}$ cm$^2$/s). The effective diffusivity within the CHM may be improved by changing the alginate properties (e.g., viscosity, density).

TABLE 2

Diffusion data for $O_2$ and $H_2$ in catalytic hydrogel

| Gas | Diffusivity in water (×10$^{-5}$ cm$^2$ s$^{-1}$) | Gradient in LDL (μmol L$^{-1}$ μm$^{-1}$) | Gradient in Hydrogel (μmol L$^{-1}$ μm$^{-1}$) | Effective Diffusivity in Hydrogel (×10$^{-5}$ cm$^2$ s$^{-1}$) |
|---|---|---|---|---|
| $O_2$ | 2.20 | 0.91 | 3.2 | 0.62 |
| $H_2$ | 4.50 | 0.48 | 1.9 | 1.1 |

Figure 8A:
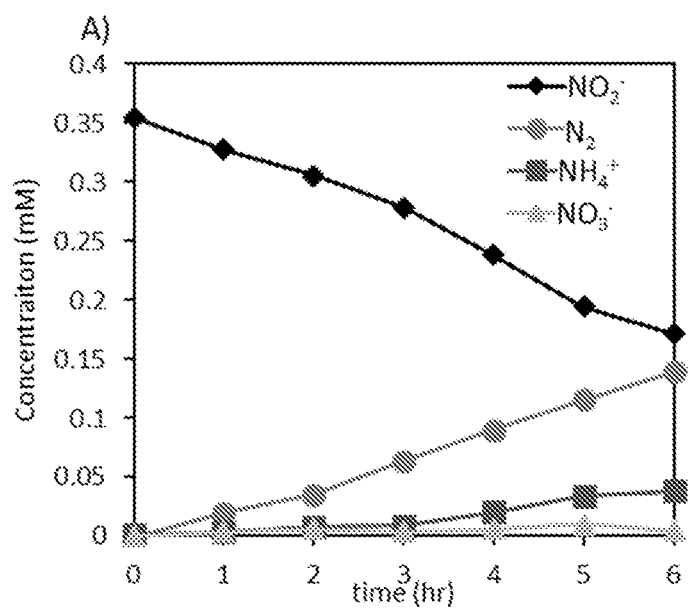
FIG. 8A shows kinetics of $NO_2^-$ removal by a CHM containing 3.68 mg of Pd.

Results of $NO_2^-$ Hydrogenation The hydrogenation of $NO_2^-$ under batch recirculating conditions was investigated for a 6-hr period using a single CHM containing 3.68 mg of Pd (FIG. 8A). Using the CHM, approximately 52% of the $NO_2^-$ was reduced during the reaction period. Only a trace amount of nitrate (<0.01 mM) was observed, which was attributed to impurities in the $NO_2^-$ stock solution because it was also present control samples. $NO_2^-$ reduction was not observed in the absence of either $H_2$ or Pd.

The loading of Pd (i.e., density) within the hydrogel affected the reactivity of the CHM. Without be limited to any particular theory, it is hypothesized that increasing the catalyst density increases the number of active sites per hydrogel unit volume, thereby improving the overall reaction activity. The percent $NO_2^-$ converted, the observed pseudo first-order rate constant (k), and the mole-Pd normalized rate constant (k'), were evaluated as a function of the Pd-loading (Table 3, FIG. 8B). For expensive noble metal catalysts, normalizing the activity to the catalyst mass provides a better appreciation of the mass-cost relationship; thus, herein the rate constant was normalized to moles of Pd per volume (i.e., k'). The Pd-loading in a single CHM was varied from 0.128 to 3.68 mg, corresponding to theoretical Pd wt./dry alginate wt. loadings of 0.5% to 12.5%. The homogeneity of the Pd-loading was assumed to be consistent across samples.

TABLE 3

Kinetics of $NO_2^-$ removal and ammonia selectivity for CHMs [a]

| Pd-Loading (mg) | Conversion (%) | k ($\times 10^{-5}$ s$^{-1}$) | k' (L mol-Pd$^{-1}$ s$^{-1}$) | Ammonia Selectivity (%) |
|---|---|---|---|---|
| 0.128 | 8.82 | 0.428 | 0.213 | 47.2 |
| 0.365 | 24.2 | 1.27 | 0.222 | 53.0 |
| 0.462 | 15.0 | 0.805 | 0.111 | 45.7 |
| 0.603 | 23.7 | 1.23 | 0.130 | 41.8 |
| 1.20 | 25.3 | 1.35 | 0.072 | 32.2 |
| 1.58 | 24.2 | 1.22 | 0.049 | 62.7 |
| 1.77 | 35.0 | 1.79 | 0.065 | 42.0 |
| 2.51 | 40.7 | 2.44 | 0.062 | 19.1 |
| 2.86 | 40.6 | 2.42 | 0.054 | 12.6 |
| 3.68 | 51.5 | 3.44 | 0.060 | 9.89 |

[a] First-order rate constants are given in normal units and with normalization for Pd mass. Reaction time was 6 hrs.

Figure 8B:
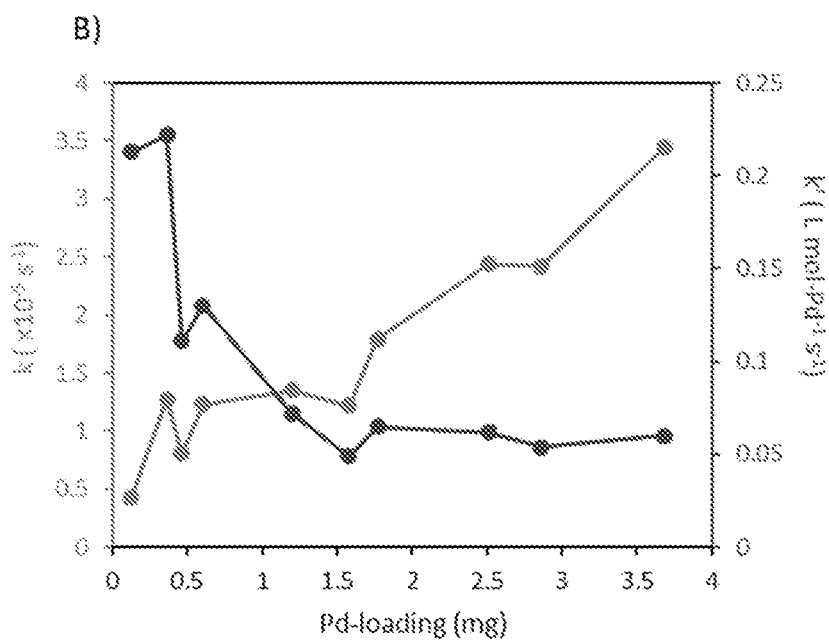
FIG. 8B shows rate constants of $NO_2^-$ removal as function of total Pd embedded in the CHM. k is the observed rate constant and k' is the Pd mass-normalized rate constant.
Figure 9:
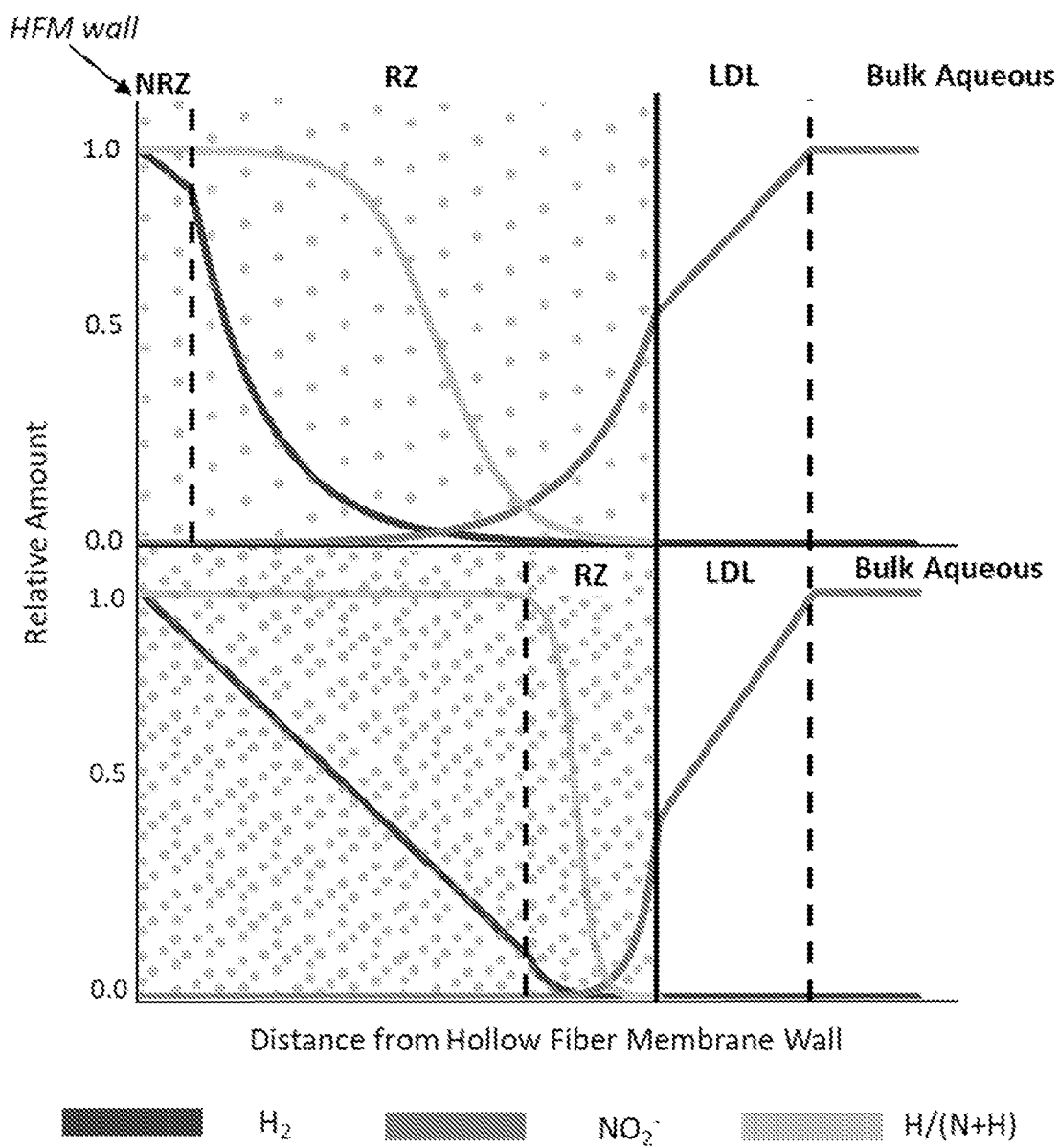
FIG. 9 shows a conceptual diagram of counter-diffusional $H_2$ and $NO_2^-$ transport in a CHM with a low Pd-loading density (top panel) and a high Pd-loading density (bottom panel). The ratio of $H_2$ to $N_2$ throughout the hydrogel region is shown as a ratio of $H_2$ to the total $H_2+NO_2^-$. $H_2$ and $NO_2^-$ are shown in relative amounts varying from 0 to 1 (concentrations divided by their highest concentration at the hydrogel boundary). Shifts in RZ thickness are exaggerated for clarity.

The k for $NO_2^-$ increased with Pd-loading ($R^2$=0.91), reaching a maximum of $3.44 \times 10^{-5}$ s$^{-1}$ for highest Pd mass used (FIG. 8B). The opposite trend was observed for k'. A maximum of 0.213 L mol-Pd$^{-1}$ s$^{-1}$ was achieved at the lowest Pd-loading, and it decreased with increasing Pd-loading until leveling at loadings greater than 1.5 mg Pd. These trends suggest increasing the amount of Pd increases the overall removal rates at the expense of lowered catalytic efficiency per mass of Pd. For the CHM, this behavior can be best described by relationship between the RZ thickness and Pd-loading density (FIG. 9).

At lower Pd-loadings, $NO_2^-$ can diffuse deeper into the hydrogel from the bulk solution due to the lower density of available Pd sites. The result is a larger RZ within the hydrogel (FIG. 9, top panel), which will impart greater mass transfer limitations due to longer diffusion lengths. This reduces k, but the Pd-mole normalized rate (k') benefits because more Pd throughout the hydrogel is utilized. Conversely, for higher Pd-loadings, there is a higher probability $NO_2^-$ will react with Pd-sites near the bulk aqueous solution without diffusing deeper into the hydrogel, creating a smaller RZ within the hydrogel (FIG. 9, bottom panel). The smaller RZ results in a faster k because internal diffusion effects are minimized, but it reduces the Pd mole-normalized rate (k') since less Pd is being used within the hydrogel (i.e., only Pd near the bulk solution). Because diffusion within the hydrogel is progressively irrelevant with increasing Pd-loadings, k' eventually levels off and becomes strictly governed by the inherent reaction rate of the catalyst. The RZ is responsive to bulk concentrations of $H_2$ and $NO_2^-$, and Pd-loading, and therefore may be manipulated by adjustment of any of these parameters, which may change observed kinetics as conditions within the RZ vary.

Figure 10A:
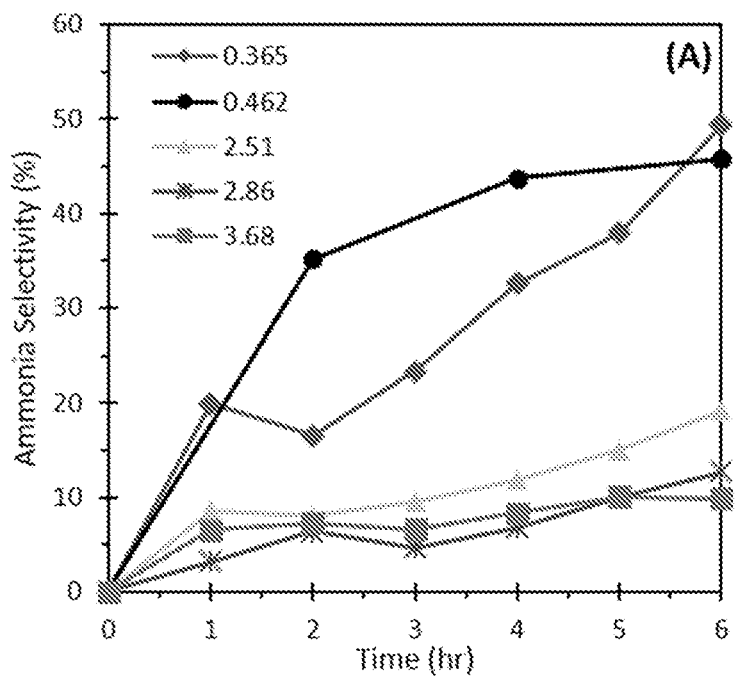
FIG. 10A shows $NH_4^+$ selectivity as a function of reaction time for CHMs with varying Pd-loadings. The Pd mass (mg) for each sample is given in the legend.
Figure 10B:
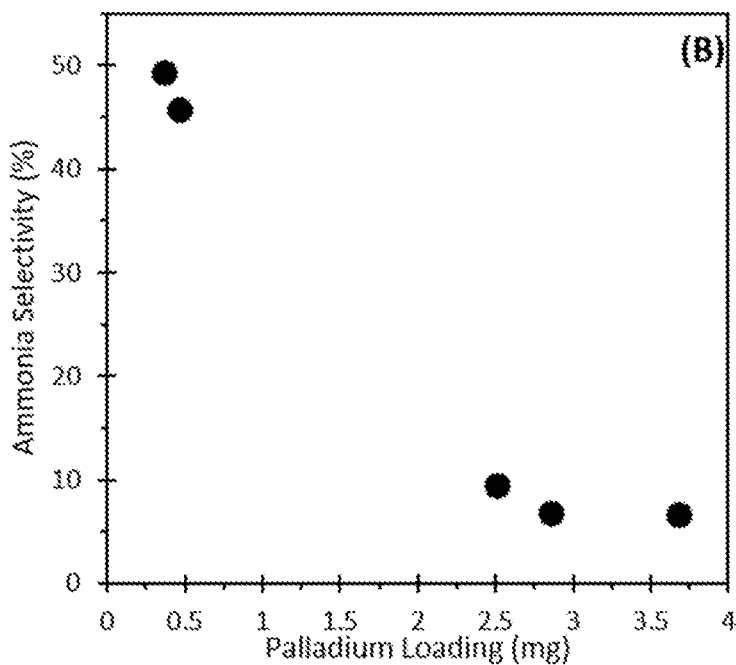
FIG. 10B shows $NH_4^+$ selectivity as a function of Pd-loading for each sample at approximately 25% $NO_2^-$ conversion.

By-product selectivity is an outcome for evaluating the efficacy of the catalytic treatment of contaminants in water, and it can be used to further characterize the CHM. For $NO_2^-$, $NH_4^+$ forms selectively when the H/N ratio at catalytic active sites is high. As shown in Table 3 and FIGS. 10A and 10B, the $NH_4^+$ selectivity declined with increasing Pd-loading and increased with reaction time for all samples. The $NH_4^+$ selectivity increased with reaction time because the H/N ratio increased as N was depleted (FIG. 10A). Selectivity can also be altered by pH changes during the reaction. Due to the low initial $NO_2^-$ concentrations and relatively low conversions (<30%), minimal pH shifts were observed ($\Delta$pH<1). Presumably, at higher Pd-loadings where the overall N removal is greater for the same reaction time, a higher $NH_4^+$ selectivity should be observed. This effect was not observed though, even when considering the selectivity at the same $NO_2^-$ removal for each loading (FIG. 10B). This behavior indicates the Pd-loading is the dominant driver of $NH_4^+$ selectivity in the CHM.

Effect of $H_2$ delivery method and mass transport on the activity and selectivity of $NO_2^-$ hydrogenation Two co-diffusional experimental scenarios were used to determine the effects of mass transport of $H_2$ and $NO_2^-$ on the activity and by-product selectivity of $NO_2^-$ hydrogenation. First, using a CHM (0.6 mg Pd), $H_2$ was bubbled directly into the bulk solution, similar to a traditionally supported catalyst. Then, the Pd nanoparticles (0.60 mg) were extracted from the CHM and the experiment was run again with $H_2$ bubbling directly into the bulk solution.

The normalized first-order rate constants (k') for the counter-diffusional CHM, co-diffusional CHM, and co-diffusional suspension were 0.130, 0.168, and 0.180 L mol-Pd$^{-1}$ s$^{-1}$, respectively. From these results, an activity ratio was calculated to highlight mass transfer limitations by the hydrogel and co-diffusional H delivery. The activity ratio is defined herein as the ratio between the reaction rate of the supported catalysts to the suspended catalysts (e.g., counter-diffusional/suspended). The activity ratios were calculated to be 0.72 and 0.93 for counter-diffusion and co-diffusion systems, respectively. These results indicate diffusion played a role in limiting the reaction rate. Furthermore, mass transport limitations in the co-diffusional system were lower compared to the counter-diffusional system, which is contrary to the premise that the counter-diffusional system should be more efficient. This outcome can be explained by considering the influence of hydrogel thickness on the counter-diffusion system. For reaction to occur in the counter-diffusion system, the species must penetrate the hydrogel thickness to reach the RZ where both are present to react, while in the co-diffusion system both species only diffuse as far as necessary to reach unfilled active sites.

For comparison, an additional experiment was conducted using a more densely loaded CHM (2.51 mg Pd). Similarly, the rate of the suspended catalysts (0.114 L mol-Pd$^{-1}$ s$^{-1}$) was greater than the counter-diffusional system (0.062 L mol-Pd$^{-1}$ s$^{-1}$), resulting in a comparatively lower activity ratio of 0.54. These results further confirm the Pd mass normalized activity of densely-loaded CHMs is more significantly affected by diffusion limitations as the shallow RZ uses a lower percentage of Pd and $H_2$ must diffuse further into the hydrogel from the HFM. Thus, to reduce mass transfer limitations in the counter-diffusional system, the thickness of the hydrogel and the Pd loading may be adjusted.

Although optimization of the counter-diffusional system to account for $H_2$ mass transfer limitations may be challenging, counter-diffusional systems surpass co-diffusional systems because of the reduced $H_2$ consumption. Assuming the $H_2$ consumption in counter-diffusional system is driven by the reaction with $NO_2^-$ and $O_{2(aq)}$, the total $H_2$ consumption during a 6-hr hydrogenation experiment is estimated to be approximately 5.6-7.0×10$^{-4}$ moles. For the co-diffusional and suspended catalysts systems, $H_2$ is bubbled into the bulk solution. This $H_2$ largely dissipates into the atmosphere, and the total consumption during a 6-hr period at a flow rate of 100 mL/min is 1.47 moles, which is approximately four-orders of magnitude greater than the counter diffusional system.

In this study, counter-diffusional experiments were conducted in closed-mode (i.e., where gas may only exit the lumen by diffusion through the wall), which greatly reduces overall $H_2$ consumption, but encourages back-diffusion of inert gases (e.g., $N_2$) into the lumen. Back-diffusion lowers the overall $H_2$ availability and thus the activity. This inefficiency can be addressed by using simple operational modifications (e.g., periodic lumen venting) that can improve the activity of counter-diffusional reactors while preserving advantages of closed-mode counter-diffusional reactors, including operational safety.

Another benefit of the counter-diffusional system the ability to control the amount of $H_2$ that reaches the RZ. For $NO_2^-$ hydrogenation, changing the H/N ratio at reactive sites greatly affects the by-product selectivity. For approximately 25% $NO_2^-$ removal, the $NH_4^+$ selectivity was 42%, 77%, and 92% for counter-diffusional, co-diffusional, and suspended catalyst systems, respectively. Supplying $H_2$ through the lumen allows control of the amount that reaches RZ since $H_2$ must diffuse through the hydrogel toward the bulk solution. Compared to the co-diffusional systems, the counter-diffusional system resulted in a lower H/N ratio and thus a lower $NH_4^+$ selectivity.

Figure 11:
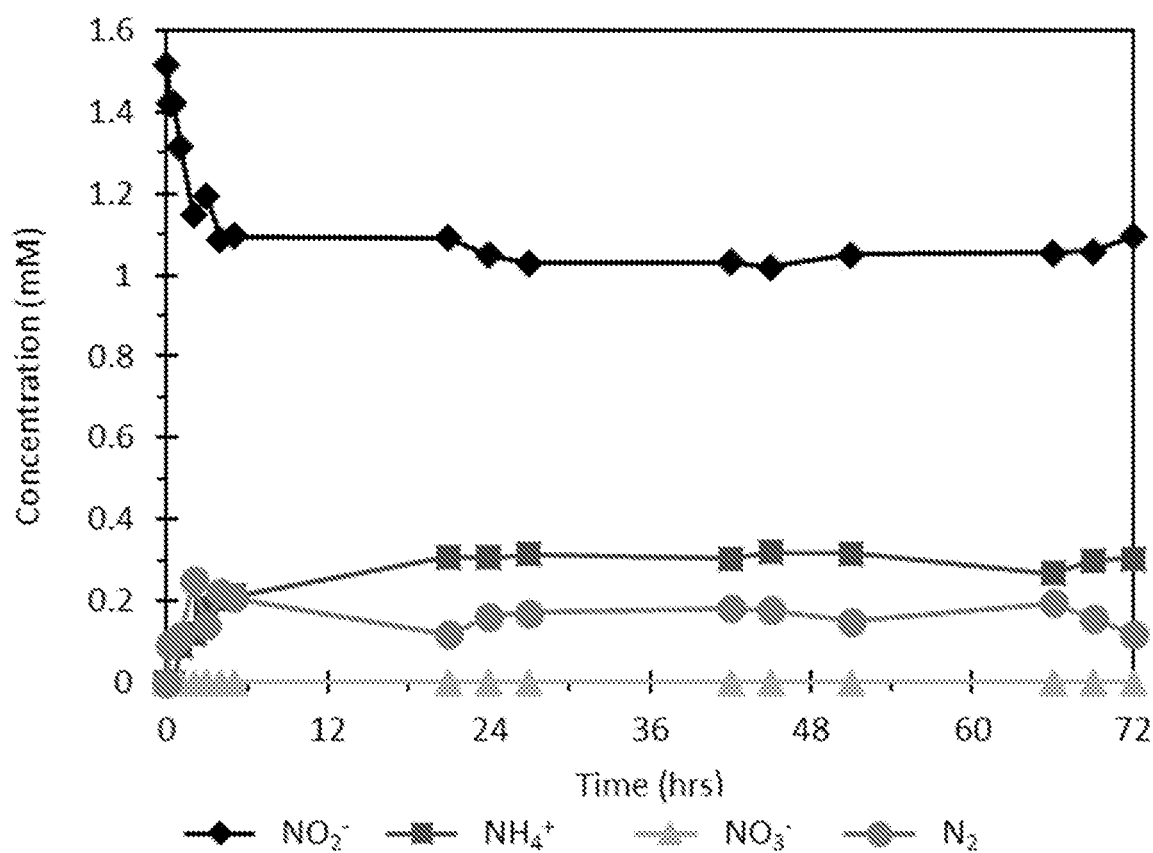
FIG. 11 shows conversion of $NO_2^-$ in a groundwater in a continuous mixed flow reactor operated for 3 days. The reactor included eight CHMs bundled together.

Short-term stability in groundwater To evaluate the potential of the CHM to operate under more realistic treatment conditions, hydrogenation of $NO_2^-$ in groundwater was investigated for three days using a completely mixed flow reactor (FIG. 4B). The reactor consisted of eight CHMs in parallel to increase the overall Pd-loading in the system (10.42 mg), while maintaining a consistent Pd-loading for each CHM (1.30±0.32 mg). Steady removal of $NO_2^-$ occurred over the time period (FIG. 11), indicating the short-term stability of the CHM. The overall percent removal of $NO_2^-$ was 30% after 1 day, 31% after 2 days, and 29% after 3 days. The rate constant for $NO_2^-$ was determined to be 0.073 L mol-Pd$^{-1}$ s$^{-1}$, which is approximately the same for a similar Pd-loading in the single-fiber CHM and batch-recycle system (Table 3). Selectivity for $NH_4^+$ was found to be higher in the tested system, with the selectivity averaging 65% upon reaching steady state. The cause of this shift is unclear and will require further analysis of the effects of individual components on function of the catalytic hydrogels. These results confirm the intermediate time-scale stability of the CHM for drinking water treatment.

Remarkably, results herein suggest the CHM reactor provides a new approach for treatment of contaminants using heterogeneous hydrogenation catalysis (HHC). The fastest rates reported in this study for $NO_2^-$ (first-order k'=0.213 L mol Pd$^{-1}$ s$^{-1}$, zero-order k'=5.41 mol-N mol-Pd$^{-1}$ s$^{-1}$×10$^{-5}$, Table 4) are lower than published rates for Pd on various supports in batch and continuous-flow reactors (Table 5). The difference between catalytic activity in immobilized counter-diffusional and suspended batch operation (activity ratio 0.54-0.72) further compares favorably to other immobilized systems, where greater reductions in activity have been reported by particle immobilization.

TABLE 4

Kinetic parameters for hydrogenation of nitrite by CHMs

| Palladium Loading | | | | First-Order | | | Zero-Order | | |
|---|---|---|---|---|---|---|---|---|---|
| Mass Pd (mg) | Estimated Density (% mass)* | Mass density (% mass) | surface area (m$^2$ Pd)** | k (s$^{-1}$ × 10$^{-5}$) | k' (L mol Pd$^{-1}$ s$^{-1}$) | k" (L m-Pd$^{-2}$ s$^{-1}$) (s$^{-1}$ × 10$^{-5}$) | k (mol L$^{-1}$ s$^{-1}$ × 10$^{-9}$) | k' (mol-N mol-Pd$^{-1}$ s$^{-1}$ × 10$^{-8}$) | k" (mol-N m-Pd$^{-2}$ s$^{-1}$ × 10$^{-9}$) |
| 0.128 | 0.5 | 0.93 | 0.014 | 0.428 | 0.213 | 1.82 | 1.08 | 1.51 | 4.65 |
| 0.365 | 2.5 | 2.3 | 0.040 | 1.27 | 0.222 | 1.900 | 2.97 | 1.44 | 4.44 |
| 0.462 | 2.5 | 3.67 | 0.051 | 0.805 | 0.111 | 0.951 | 2.69 | 1.03 | 3.18 |
| 0.603 | 2.5 | 2.5 | 0.066 | 1.23 | 0.130 | 1.11 | 3.63 | 1.06 | 3.29 |
| 1.2 | 7.5 | 8.55 | 0.132 | 1.35 | 0.072 | 0.615 | 3.96 | 0.58 | 1.81 |
| 1.575 | 12.5 | 14.1 | 0.173 | 1.22 | 0.049 | 0.423 | 3.80 | 0.42 | 1.32 |
| 1.768 | 12.5 | 12.5 | 0.194 | 1.78 | 0.065 | 0.552 | 4.99 | 0.50 | 1.54 |
| 2.51 | 7.5 | 11.7 | 0.276 | 2.44 | 0.062 | 0.531 | 5.55 | 0.39 | 1.20 |
| 2.86 | 12.5 | 22.7 | 0.314 | 2.41 | 0.054 | 0.461 | 6.52 | 0.40 | 1.24 |
| 3.686 | 12.5 | 13.2 | 0.405 | 3.43 | 0.060 | 0.509 | 9.14 | 0.44 | 1.35 |

*Estimated density of palladium present in synthesis solution from concentration of Pd(NO$_3$)$_2$ in soak solution.

**Palladium surface area estimated assuming the average palladium particle is spherical with a diameter of 4.59 nm as determined by TEM.

k: observed rate constant.

k': mole normalized rate constant.

k": palladium surface area normalized.

TABLE 5

Comparison of fastest-reported rate constants for nitrite hydrogenation in various reactors

| Catalyst | Reactor Structure | k' (L mol-Pd$^{-1}$ s$^1$) | Zero-order k' (mol-N mol-Pd$^{-1}$ s$^{-1}$ × 10$^5$) | Initial NO$_2^-$ (mM) | pH |
|---|---|---|---|---|---|
| Pd/CHM | batch-recycle | 0.213 | 5.41 | 0.35 | 6-7.7 |
| Pd/CNF | batch | 62.1 | NR | 2 | 5 |
| Pd-In/Al$_2$O$_3$ | batch | 33.3 | NR | 0.08 | 7 |
| Pd/Carbon Fiber | batch-immobilized catalyst | 1.76 | NR | 0.22 | 6 |
| Pd/CNF-MWCNT | batch | 2.24 | NR | 0.1 | 7.3 |
| Pd/CNF | batch | 0.0883 | NR | 0.1 | 7.3 |
| Ru/C | Semi-batch | 2.54 | NR | 1.6 | 5 |
| Pd/CNF-Nickel Foam | immobilized flow through | NR | 377 | 0.43 | 5 |
| Pd/CNF | Egg-shell interfacial | NR | 0.97 | 0.044 | NR |
| Pd-In/Al$_2$O$_3$* | batch | NR | 1375 | 2.42 | 5 |
| Pd-In/Al$_2$O$_3$* | trickle bed | NR | 246 | 1.13 | 6.2 |

Example 4. Nitrite Hydrogenation Using CHMR—Continuous Flow Configuration

Figure 12A:
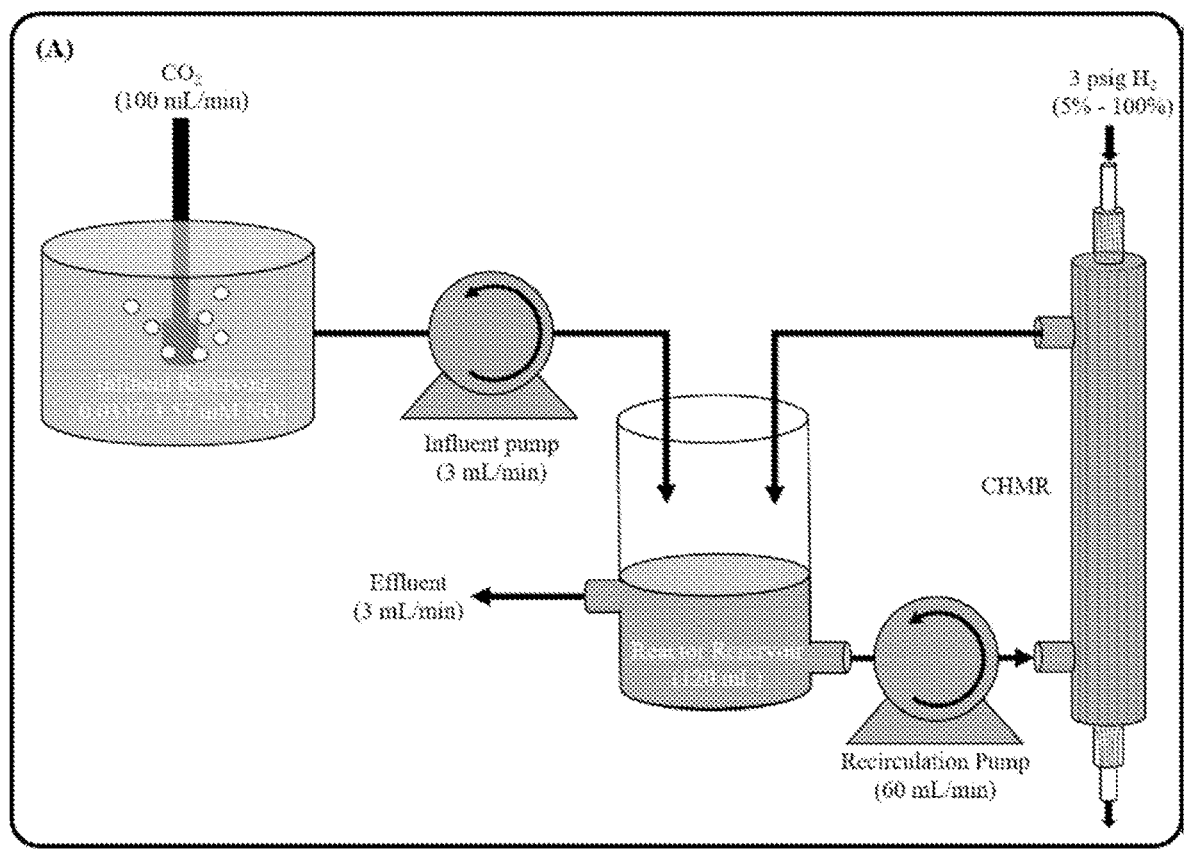
FIG. 12A shows a schematic of a catalytic hydrogel membrane reactor (CHMR) configuration including selected reactor parameters.
Figure 12B:
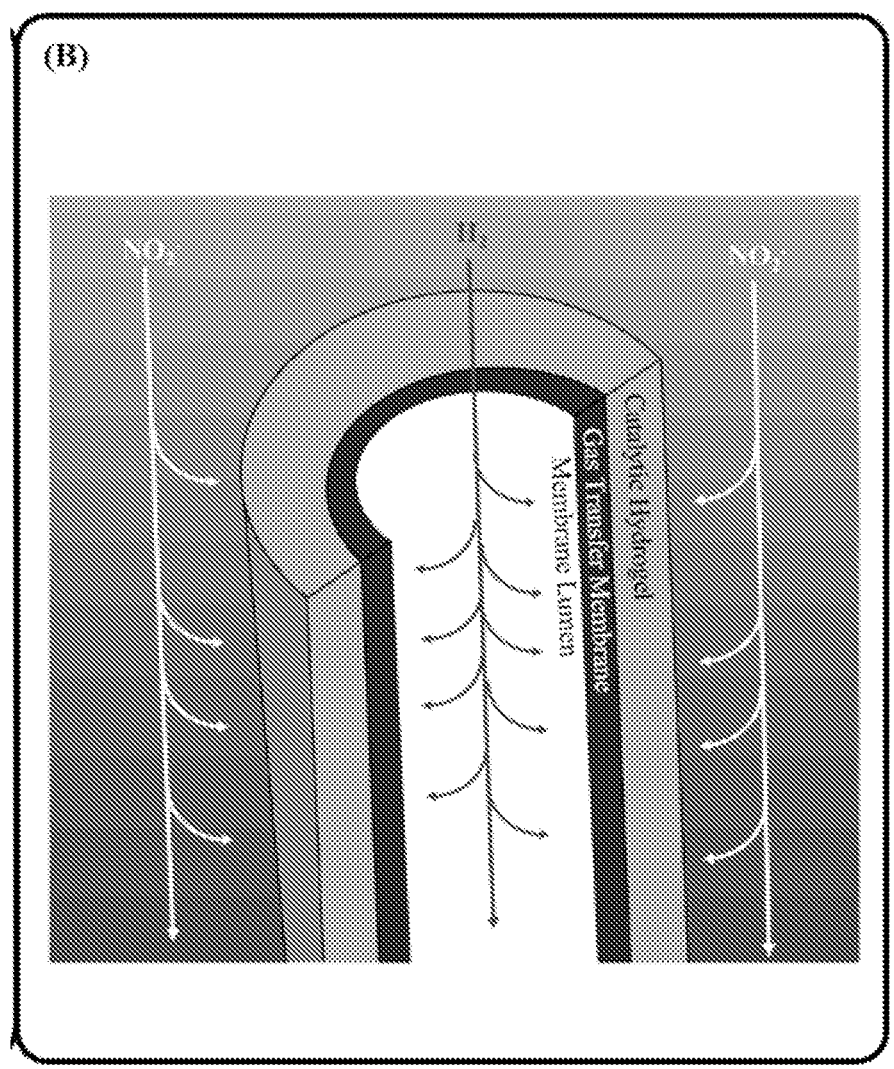
FIG. 12B shows a magnified schematic of a single CHM within the reactor showing the counter-diffusional delivery of $NO^{2-}$ and $H_2$ to the catalytic hydrogel.

In this study, the CHMR was configured as a continuous-flow reactor with recycle (FIGS. 12A and 12B). For NO$_2^-$ hydrogenation experiments, NO$_2^-$ was added to the influent reservoir (1000 mL) at varying concentrations. The reactor pH was buffered (5.8 to 6.3) by bubbling carbon dioxide (CO$_2$, #CD75, American Gas and Welding) at 100 mL/min and by addition of 10 mM sodium bicarbonate (NaHCO$_3$, ACS grade, #41900068-1, bio-world) into the influent reservoir. To counteract the possibility of the Na$^+$ ions de-linking the Ca-alginate hydrogel, 1.4 mM calcium chloride (CaCl$_2$, anhydrous, C77-500, Fisher Scientific) was also added. The influent reservoir was fed to a reactor reservoir (120 mL) by a peristaltic pump (3 mL/min). The reactor reservoir had two outlets. The first outlet led to the CHMR and this was recycled through the CHMR and back into the reactor reservoir using a peristaltic pump (60 mL/min, liquid velocity 2.4 cm s$^{-1}$). The flowrate was chosen to establish a recycle ratio of 20 so the overall behavior of the system was comparable to a completely stirred reactor. The second outlet was the system effluent (at water level) and the flowrate matched the influent flowrate (3 mL/min), creating a hydraulic retention time in the combined CHMR and reactor reservoir of 40 min.

Reaction conditions for a typical experiment are listed in Table 6. In all experiments, the pumps were first turned on until the CHMR volume was full and liquid was detected in the effluent. Then, at t=0, hydrogenation (the reaction) was initiated by supplying H$_2$ at 3 psig (1.22 bar) to the CHMR through the HFM lumen. NO$_2^-$ and NH$_4^+$ concentrations were measured in the effluent at regular intervals using ion chromatography (IC; Dionex ICS 5000+, AS-23 column, CS-12A column).

TABLE 6

Reactor parameters and reaction conditions for catalytic hydrogenation of NO$_2^-$ with the CHMR

| Parameter | Value |
|---|---|
| Total Pd-loading (mg) | 2.26-9.70 mg |
| H$_2$ % in lumen | 5-100 |
| influent NO$_2^-$ | 0.350-3.57 mM |
| pH | 5.8-6.3 |
| Total Gas Pressure | 3 psi |
| H$_2$ delivery mode | Open-ended |
| Influent/Effluent Flow rate | 3 mL/min |
| Bed Volume | 120 mL |
| Recycle Rate | 60 mL/min |
| Hydraulic Residence Time | 40 min |
| Recycle Ratio | 20 |
| NaHCO$_3$ | 10 mM |
| CaCl$_2$ | 1.4 mM |
| CO$_2$ bubble rate | 100 mL/min |

Effect of the H$_2$ Delivery Mode The effect of the H$_2$ delivery mode on the NO$_2^-$ reduction activity and the H$_2$ consumption efficiency was evaluated by running the CHMR in closed, open, and vented modes. A valve was installed at the end of the HFM to control the release of H$_2$ to the atmosphere. For all experiments, 1.78 mM NO$_2^-$ (NaNO$_2$, reagent grade, #0535, VWR) was provided in the aqueous influent and 3 psig (1.22 bar) of 100% H$_2$ (ultra-high purity, #HY-UHPT, American Gas and Welding) was supplied to the HFM lumen. For open mode operation, experiments were conducted with the valve open, which allowed all H$_2$ not diffusing through the HFM wall to exit to the atmosphere. Using a flow meter, the H$_2$ flowrate in open mode was measured to be approximately 4 L min$^{-1}$ at 3 psig. For closed mode operation, the valve was closed to prevent the escape of H$_2$ from the lumen end, so H$_2$ could only leave by diffusing through the HFM wall. For the vented mode experiment, the valve was opened every 15 min for 5 s.

Independent control of the H$_2$ delivery into the lumen is a critical aspect of the CHMR due to the influence of the H$_2$ concentration on the catalytic activity and byproduct selectivity. H$_2$ delivery can be achieved through different modes that will influence the H$_2$ concentration in the catalytic hydrogel and H$_2$ consumption efficiency. In the "closed mode," the HFM is sealed at the end and all H$_2$ that enters can only leave by diffusion through the HFM wall. H$_2$ consumption efficiencies in this mode approach 100% since all H$_2$ must pass into the catalytic hydrogel where reaction occurs. The drawback to closed mode is back-diffusion of non-reactive gases (i.e., $CO_2$, $N_2$) from the aqueous phase into the sealed membrane. Back-diffusion results in an $H_2$ gradient along the lumen length (i.e., lower $H_2$ at one end), and therefore in the hydrogel, which lowers the catalytic activity of the CHMR. In the "open mode," the HFM is open at the end, and all the $H_2$ that does not diffuse through the HFM wall exits the HFM into the atmosphere. This mode is used to prevent formation of the unwanted $H_2$ gradients, and it improves catalytic activity, but causes a low $H_2$ consumption efficiency. The final option is a mixture of closed and open modes, called "vented mode," in which the HFM is set up similar to closed mode, but a valve is placed at the end of the HFM to allow it to be opened at regular intervals to flush out the inert gases. This maintains a consistent $H_2$ partial pressure throughout the HFM while ensuring good $H_2$ consumption efficiency. In this study, a conservative vent cycle of 15 min closed followed by 5 s open was selected to maximize activity, limit $H_2$ gradient formation in the lumen, and allow pseudo-steady state conditions to develop in the CHMR.

Figure 13:
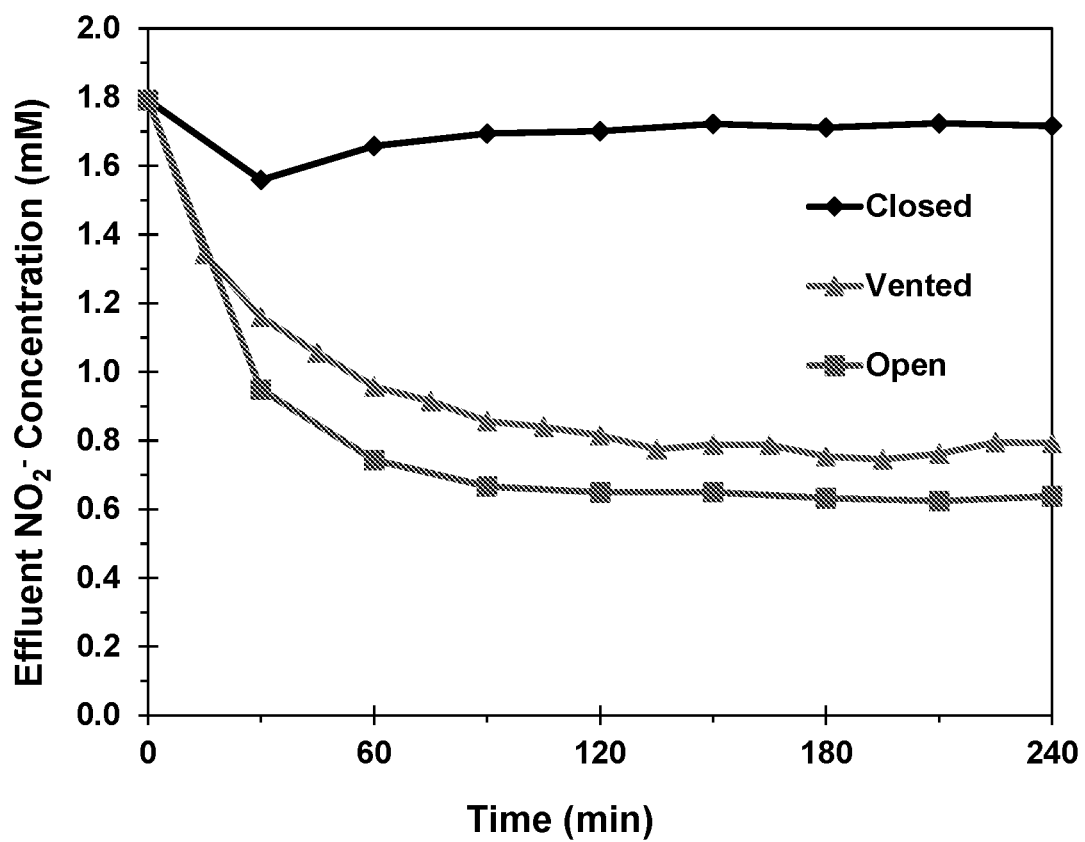
FIG. 13 shows a representative continuous-flow operation of a CHMR under open, closed, and vented operation modes for H2 supply. The hydraulic retention time was 40 min.

The results of the $NO_2^-$ hydrogenation experiments operated in open, closed, and vented modes in shown in FIG. 13. At the beginning of hydrogenation, the effluent $NO_2^-$ concentration is equal to the influent concentration, and the effluent concentration continuously decreases until steady state is achieved. Steady-state conditions were reached within 2.5 hours for all operation modes. The average $NO_2^-$ conversion at steady-state for open, closed, and vented modes was 64.5±0.6%, 4.0±0.4%, and 56.8±1.1%, respectively. In closed mode, the $NO_2^-$ conversion was greatest at the first time point as the $H_2$/inert gas gradient had not yet fully developed. As the reaction proceeded, the conversion decreased as the gradient in the lumen fully developed, stabilizing within 2 hrs. Conversions were comparable between open and vented modes, suggesting their $H_2$ concentrations were similar in the catalytic hydrogel. The standard deviation of the average conversion was higher in vented mode compared to open and closed modes due to the repeated development of transient $H_2$ gradients during the 15-min periods between venting, which prevented a true steady-state from occurring.

The $H_2$ consumption efficiency can be determined by evaluating the ratio of $H_2$ consumed by reaction with $NO_2^-$ to the total volume released from the supplying tank during the reaction period. During a 1-hr steady-state period, approximately 0.039, 0.62, and 0.54 mmol of $H_2$ were consumed by the reaction in closed, open, and vented modes, respectively. In the closed mode, the $H_2$ consumption efficiency approached 100% because all $H_2$ was assumed to leave the lumen only by diffusion. In open mode, most of the $H_2$ was released to the atmosphere (~9809 mmol/hr), so a low consumption efficiency of 0.0064% was observed. In the vented mode, 54.4 mmol of $H_2$ exited the lumen during the four open venting cycles per hour, resulting in an $H_2$ consumption efficiency of approximately 1.0%. While this efficiency is still low compared to the closed mode, the $NO_2^-$ removal was much higher, providing an excellent compromise between catalytic performance and $H_2$ consumption efficiency. Operation of the CHMR in the vented mode can be improved with an optimized venting scheme (i.e., reduce vent time) that minimizes $H_2$ gradient formation and loss of $H_2$ through the lumen end. This would also improve the $H_2$ consumption efficiency. All further experiments in this study were conducted in open mode to simplify reactor conditions and remove extraneous processes (e.g., formation of $H_2$ gradients).

Effect of Reactant Species Concentrations The effect of $NO_2^-$ and $H_2$ concentrations on the catalytic activity was investigated by varying the influent $NO_2^-$ concentrations (0.357 to 3.57 mM) and the percent $H_2$ (5 to 100%, pre-mixed with $N_2$, ultrahigh purity, American Gas and Welding) provided to the lumen during catalytic hydrogenation in open mode using the reactor configuration described previously. All experiments were operated until steady-state was achieved, as confirmed by periodic measurement of $NO_2^-$ concentrations in the reactor effluent. $NO_2^-$ conversion and rate constants were calculated.

Figure 14A:
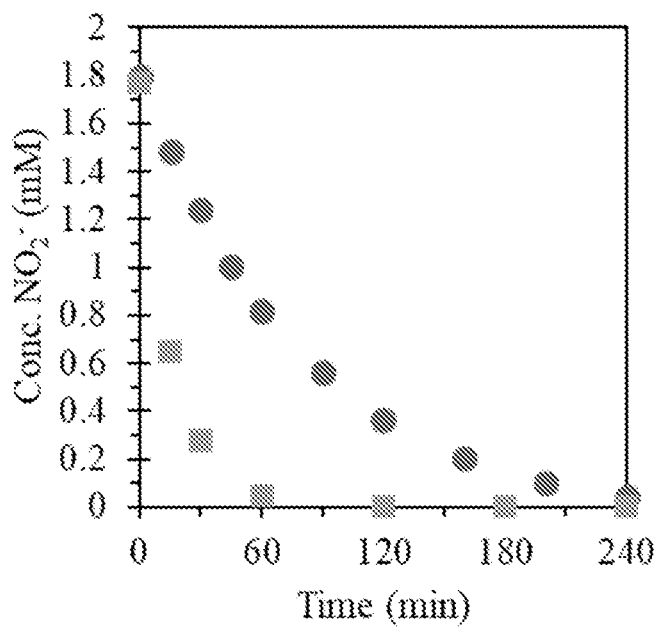
FIG. 14A shows batch removal of $NO_2^-$ by recovered Pd nanoparticles suspended in aqueous solution with $H_2$ (100 mL/min) and $CO_2$ (150 mL/min).
Figure 14B:
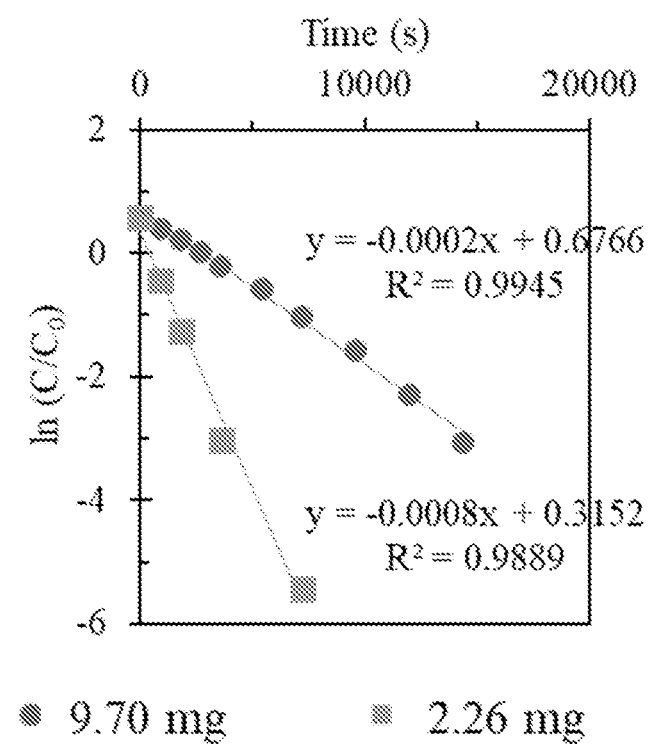
FIG. 14B shows first order kinetics fit of $NO_2^-$ removal by suspended catalyst particles.

Evaluation of the effect of the influent concentration of the reactive species (i.e. $H_2$, $NO_2^-$) on the reaction rate was conducted for the CHMR. A batch experiment using suspended catalysts was first run to determine the reaction rate on the catalyst without interference from mass transport limitations. These kinetic results confirmed that $NO_2^-$ reduction followed pseudo first-order behavior on Pd (FIGS. 14A and 14B). Continuous-flow CHMR experiments were then conducted in open mode using a range of influent $NO_2^-$ (0.357-3.57 mM) and $H_2$ concentrations (5-100% in $N_2$). Two Pd-loadings (low: 2.26 mg; high: 9.70 mg) were selected to evaluate the effect of the number of active sites on the reaction rate.

The reaction rate, r', for a range $H_2$ concentrations as a function of effluent $NO_2^-$ concentrations (i.e., steady-state) for the high and low loadings, respectively, was determined (FIGS. 15A and 15B). r' is the reaction rate normalized to Pd molarity (i.e., mol-N mol-Pd$^{-1}$ s$^{-1}$) and is obtained from the from the steady-state continuous-flow experiments (Table 7). For all conditions, r' increased with increasing $H_2$ and $NO_2^-$ concentrations, and r' for the low Pd loading was higher at all conditions compared to the high Pd loading. Because the curve slopes are not linear and different rates were observed for the $H_2$ variations under similar conditions, this indicates that the overall reaction rate is not strictly first-order and the rate will be dependent on the number of active Pd sites, the concentration of $H_2$, and the $NO_2^-$ concentration.

Pd normalized $NO_2^-$ conversion for a range $H_2$ concentrations as a function of effluent $NO_2^-$ concentrations for the high and low loadings, respectively, was determined (FIGS. 15C and 15D). Similar to trends observed for the reaction rate (FIGS. 15A and 15B), higher influent $H_2$ concentration and the lower Pd loading achieved the greatest the Pd normalized $NO_2^-$ conversion, but an opposite trend was observed for the steady-state $NO_2^-$ concentration. Increasing the influent $NO_2^-$ concentration generally decreased the $NO_2^-$ conversion, except for the 25, 50, and 100% $H_2$ conditions of the low loading, where the conversion initially increased and then decreased with increasing $NO_2^-$ concentration. This observation combined with the slope of the reaction rate curves indicates that the reaction order shifts between zero and first order.

Figure 15E:
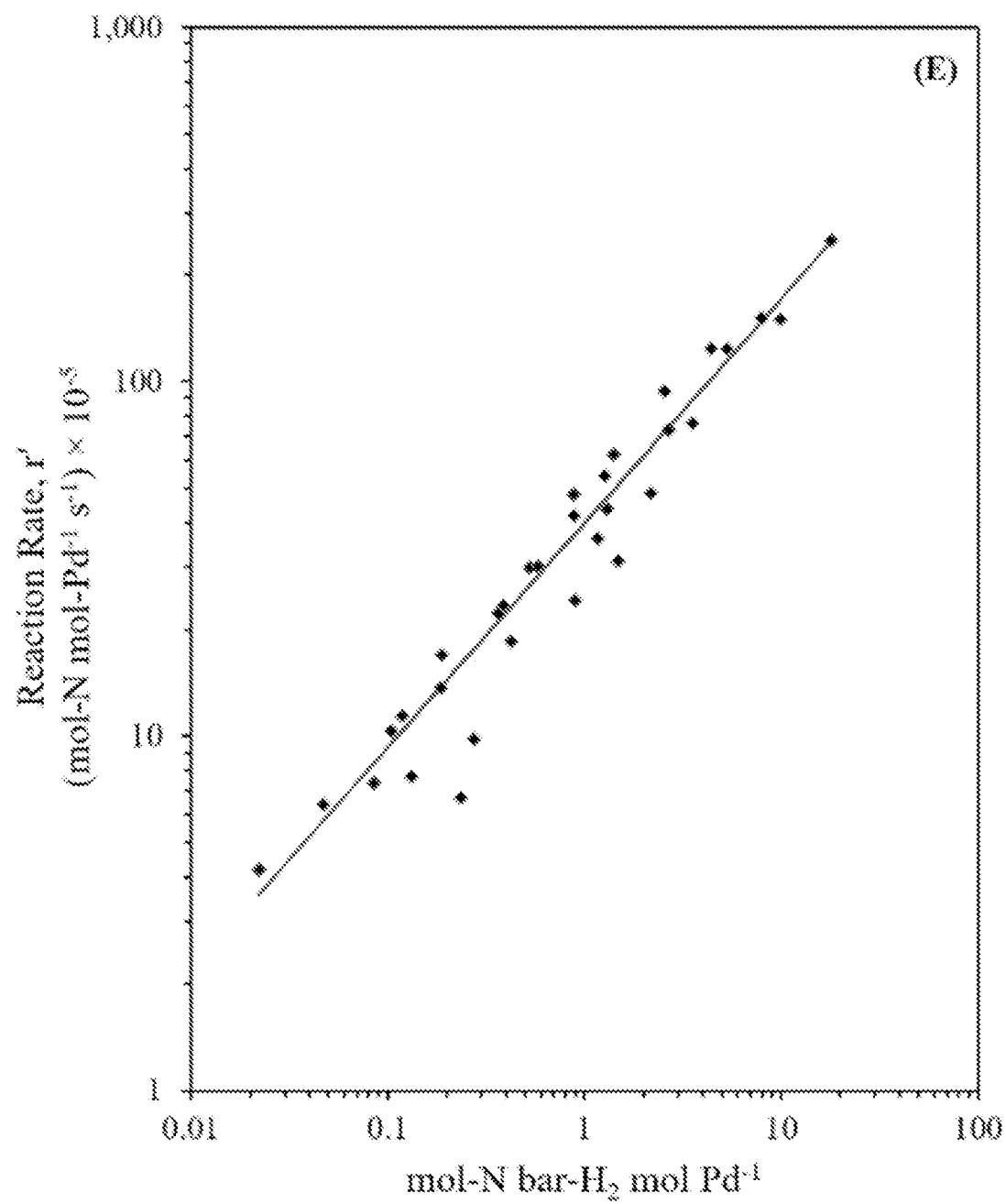

In suspended particle batch systems, the reaction rate for $NO_2^-$ hydrogenation over Pd has been shown to fit a power-law relationship (n=0.6) with respect to $NO_2^-$ at $H_2$ partial pressures greater than 1 bar. FIG. 15E shows the r' for all conditions tested in this study as a function of (mol-N bar-$H_2$ mol-Pd$^{-1}$). The data was fit a power law trend, resulting in a reaction rate constant of k=3.98×10$^{-4}$ mol-N$^{0.368}$ mol-Pd$^{-0.368}$ bar $H_2^{-0.632}$ s$^{-1}$. While this indicates a good empirical fit of the overall reaction rate, this equation is only valid for the conditions tested and it does separate the catalytic and diffusion rate contributions.

$$r' = k\left(\frac{molN\ barH_2}{molPd}\right)^{0.632}. \qquad \text{Eq 1}$$

Heterogeneous catalysis reactions are typically described by Langmuir-Hinshelwood kinetics, but it did not fit the CHMR rates presented herein, presumably due to the diffusional limitations of the CHMR. This was evident when comparing the high (FIG. 15A) and low Pd (FIG. 15B) loading results. The observed reaction rate (i.e., without Pd normalization) was greater for the high loading compared to the low loading, but because the low loading achieved a greater Pd normalized rate, this indicates that it had a wider reactive zone and used a larger percent of the active Pd sites. To evaluate the effect of diffusion limitations within the CHMR, the Pd-normalized first-order rate constant, $k_1'$, of the batch (FIGS. 14A and 14B) and CHMR experiments were used to calculate the activity ratio. The activity ratio is a measure the loss of activity in the CHMR because of mass transfer limitations, calculated by dividing $k'_{CHMR}$ by $k'_{batch}$. The $k_1'$ for the low and high Pd loadings of the CHMR were 1.32 and 0.667 L mol-Pd$^{-1}$ s$^{-1}$, respectively. In the batch system, the $k_1'$ for equivalent low and high loadings was 1.40 and 1.08 mol-Pd$^{-1}$ s$^{-1}$, respectively. The activity ratio for the low and higher loading was 0.94 and 0.62, respectively. This confirms the role of mass transport in limiting the reaction rates, especially in the case of the high loading, where the reactive zone was small and confined near the bulk solution.

While a first-order rate constant does not accurately reflect the overall reaction rate behavior for the range of conditions tested in this study, a maximum $k_1'$ was calculated to allow for general comparisons across other studies that report $k_1'$ (Table 7 and Table 8). A k' of 1.87 L mol-Pd$^{-1}$ s$^{-1}$ was calculated for the low loading at an $H_2$ partial pressure of 1.22 bar (i.e., 100%) and a 0.71 mM influent $NO_2^-$ concentration, which is approximately two orders of magnitude greater than the rate constants reported in our previous study on the CHMR that used closed mode and no $CO_2$, attesting to their operational importance. Though the byproduct selectivity was not a focus of this study, $NH_4^+$ concentrations were measured to provide insight into the effect of $H_2$ and $NO_2^-$ concentrations. Generally, the $NH_4^+$ selectivity (Table 7, FIGS. 16A and 16B) decreased as the H/N ratio decreased and remained below 5% under high influent $NO_2^-$ concentrations.

TABLE 7

Nitrite hydrogenation conversion, kinetics, and ammonia selectivity as a function of catalyst loading, hydrogen partial pressure and influent nitrite concentrations.

| Mass Pd (mg) | $H_2$ (%) | $C_0\ NO_2$ (mM) | Conversion (%) | $1^{st}$ Order k observed (hr$^{-1}$) | $1^{st}$ Order k' Pd-mass normalized (L mol-Pd$^{-1}$ s$^{-1}$) | $0^{th}$ Order k' (mol-N mol-Pd$^{-1}$ s$^{-1}$ ×10$^{-5}$) | Selectivity (%) |
|---|---|---|---|---|---|---|---|
| 9.69 | 100 | 3.607 | 38.4 | 0.935 | 0.342 | 76.0 | 4.11 |
| 9.69 | 100 | 1.786 | 55.6 | 1.84 | 0.667 | 54.5 | 14.1 |
| 9.69 | 100 | 0.664 | 64.0 | 2.55 | 0.932 | 23.3 | 32.6 |
| 9.69 | 100 | 0.319 | 63.0 | 2.56 | 0.935 | 16.9 | 36.8 |
| 9.69 | 50 | 3.593 | 24.6 | 0.49 | 0.179 | 48.5 | 1.36 |
| 9.69 | 50 | 1.864 | 40.8 | 1.04 | 0.379 | 41.9 | 14.4 |
| 9.69 | 50 | 0.864 | 47.3 | 1.34 | 0.490 | 22.3 | 22.6 |
| 9.69 | 50 | 0.355 | 58.5 | 2.11 | 0.773 | 11.4 | 30.5 |
| 9.69 | 25 | 3.571 | 18.4 | 0.338 | 0.123 | 36.0 | 0.39 |
| 9.69 | 25 | 1.857 | 29.4 | 0.624 | 0.228 | 29.9 | 6.05 |
| 9.69 | 25 | 0.710 | 35.2 | 0.815 | 0.298 | 13.7 | 17.1 |
| 9.69 | 25 | 0.347 | 39.1 | 0.963 | 0.351 | 7.4 | 33.1 |
| 9.69 | 5 | 3.586 | 4.98 | 0.078 | 0.029 | 9.8 | 0 |
| 9.69 | 5 | 1.779 | 7.83 | 0.128 | 0.046 | 7.7 | 1.33 |
| 9.69 | 5 | 0.707 | 16.6 | 0.298 | 0.109 | 6.4 | 0.975 |
| 9.69 | 5 | 0.352 | 21.7 | 0.416 | 0.152 | 4.2 | 9.81 |
| 2.26 | 100 | 3.657 | 28.9 | 0.611 | 0.956 | 249.6 | 0.85 |
| 2.26 | 100 | 1.800 | 36.0 | 0.844 | 1.32 | 152.0 | 4.7 |
| 2.26 | 100 | 0.699 | 44.3 | 1.19 | 1.87 | 72.8 | 13.8 |
| 2.26 | 100 | 0.346 | 38.3 | 0.933 | 1.46 | 31.3 | 19.5 |
| 2.26 | 50 | 3.507 | 18.1 | 0.332 | 0.519 | 149.5 | 1.51 |
| 2.26 | 50 | 1.814 | 28.9 | 0.612 | 0.959 | 123.6 | 3.16 |
| 2.26 | 50 | 0.674 | 39.2 | 0.968 | 1.51 | 62.3 | 14.6 |
| 2.26 | 50 | 0.364 | 28.2 | 0.590 | 0.923 | 24.2 | 33.7 |
| 2.26 | 25 | 3.636 | 14.5 | 0.254 | 0.398 | 124.3 | 0.4 |
| 2.26 | 25 | 1.871 | 21.3 | 0.406 | 0.637 | 94.1 | 1.5 |
| 2.26 | 25 | 0.714 | 28.5 | 0.598 | 0.936 | 48.0 | 13.3 |
| 2.26 | 25 | 0.325 | 24.2 | 0.478 | 0.749 | 18.5 | 34.3 |
| 2.26 | 5 | 3.964 | 4.68 | 0.074 | 0.115 | 43.7 | 0.8 |
| 2.26 | 5 | 1.807 | 7.12 | 0.115 | 0.180 | 30.2 | 0.56 |
| 2.26 | 5 | 0.714 | 3.99 | 0.062 | 0.098 | 6.70 | 15.0 |
| 2.26 | 5 | 0.346 | 12.6 | 0.217 | 0.339 | 10.3 | 22.2 |

TABLE 8

Comparison of fastest-reported rate constants for nitrite hydrogenation in various reactors to this study

| Catalyst | Reactor Structure | $1^{st}$ Order k' (L mol-Pd$^{-1}$ s$^1$) | $0^{th}$ Order k' (mol-N mol-Pd $^{-1}$ s$^{-1}$ × 10$^{-5}$) | Initial $NO_2^-$ (mM) | pH |
|---|---|---|---|---|---|
| Pd/CHM (low) | Continuous-recycle | 1.87 | 72.8 | 0.71 | 5.8 |
| Pd/CHM (low) | Continuous-recycle | 0.956 | 249 | 3.57 | 5.8 |
| Pd/CHM (high) | Continuous-recycle | 0.935 | 16.9 | 0.35 | 5.8 |
| Pd/CHM (high) | Continuous-recycle | 0.342 | 76.0 | 3.57 | 5.8 |
| Pd/CHM | batch-recycle | 0.213 | 5.41 | 0.35 | 6-7.7 |
| Pd/CNF | batch | 62.1 | NR | 2 | 5 |
| Pd-In/Al$_2$O$_3$ | batch | 33.3 | NR | 0.08 | 7 |
| Pd/Carbon Fiber | batch-immobilized catalyst | 1.76 | NR | 0.22 | 6 |
| Pd/CNF-MWCNT | batch | 2.24 | NR | 0.1 | 7.3 |
| Pd/CNF | batch | 0.0883 | NR | 0.1 | 7.3 |
| Ru/C | Semi-batch | 2.54 | NR | 1.6 | 5 |
| Pd/CNF-Nickel Foam | immobilized flow through | NR | 377 | 0.43 | 5 |
| Pd/CNF | Egg-shell interfacial | NR | 0.97 | 0.044 | NR |
| Pd-In/Al$_2$O$_3$* | batch | NR | 1375 | 2.42 | 5 |
| Pd-In/Al$_2$O$_3$* | trickle bed | NR | 246 | 1.13 | 6.2 |

1-D Evaluating Effects of Diffusion Limitations Using AQUASIM Modeling $NO_2^-$ hydrogenation at Pd sites has been shown to best fit the Hinshelwood steady-state adsorption (SSA) kinetic model proposed, wherein $H_2$ adsorbs and dissociates on the Pd surface before reacting with aqueous $NO_2^-$ in the outer Helmholtz plane to form either $NH_4^+$ or $N_2$. In this study, the proposed causative factor for loss of activity with increasing $NO_2^-$ concentrations is from transport limitations of $NO_2^-$ within the catalytic hydrogel. To account for the mass transport limitations, a 1-D model was created using an AQUASIM model developed for membrane biofilm reactors and incorporating the Hinshelwood SSA kinetic model for $NO_2^-$ hydrogenation. When supplied with influent $NO_2^-$ concentrations and $H_2$ partial pressure in the lumen, the model predicts $NO_2^-$ removal at steady state and the concentration profiles of reactive species within the hydrogel. The location and thickness of the reactive zone (RZ; region of the catalytic hydrogel where $H_2$ and $NO_2^-$ interact at active catalyst active sites) can be estimated using the model and related to observed reaction kinetics. The model considers diffusion of $H_2$ from the lumen through the HFM wall and into the hydrogel, diffusion of $NO_2^-$ from the bulk aqueous zone through the stagnant LDL and into the hydrogel, and the catalytic reaction of $NO_2^-$ and $H_2$ in the RZ. The modeled reactor configuration (hydraulic retention time, reactor volume, hydrogel properties, etc.; Table 6) was taken from this study, and the chemical and physical parameters (reaction kinetic model and diffusion coefficients) were taken from previous studies. A simplified model describing the effect of only $H_2$ and $NO_2^-$ concentrations was used as a conceptual tool to elucidate the observed experimental results (Table 9).

TABLE 9

Model parameters for $NO_2^-$ hydrogenation by catalytic hydrogel membrane reactor

| Parameter | Value | Units |
|---|---|---|
| Aqueous flowrate into reactor | 5.0 × 10$^{-8}$ | m$^3$ s$^{-1}$ |
| Reactor volume | 1.2 × 10$^{-4}$ | m$^3$ |
| Influent $NO_2^-$ | 1.78 | mol-N m$^{-3}$ |
| $H_2$ lumen pressure | 1.2 | atm |
| HFM area | 0.0246 | m$^2$ |
| Membrane thickness | 3.0 × 10$^{-4}$ | m |
| Pd loading (density) | 1686.2 | mol-Pd m$^{-3}$ |
| Hydrogel thickness | 1.0 × 10$^{-3}$ | m |
| Liquid Diffusion Layer | 1.0 × 10$^{-4}$ | m |
| $NO_2^-$ reaction rate constant ($k_1$) | 7.99 × 10$^{-6}$ | m$^3$ mol-Pd$^{-1}$ s$^{-1}$ |
| H2 adsorption rate constant ($k_2$) | 2.049 × 10$^{-5}$ | (mol-H$_2$ L)$^{1/2}$ mol-Pd$^{-1}$ s$^{-1}$ |
| Aqueous diffusion coefficient H$_2$ | 4.8 × 10$^{-9}$ | m$^2$ s$^{-1}$ |
| HFM diffusion coefficient H$_2$ | 4.3 × 10$^{-9}$ | m$^2$ s$^{-1}$ |
| Aqueous diffusion coefficient $NO_2^-$ | 1.9 × 10$^{-9}$ | m$^2$ s$^{-1}$ |
| Aqueous/hydrogel diffusivity ratio | 0.25 | — |
| Dimensionless Henry's Constant, H$_2$ | 1.282 | — |

Specifically, a 1-D model was constructed in AQUASIM, a water treatment simulation software that allows for linked reactor compartments to be analyzed together. The model itself is based off of previous work and incorporates a "biofilm" compartment that includes the hydrogel and bulk aqueous regions, which are connected by a liquid diffusion layer. The catalytic hydrogel can be considered a simple biofilm that is not affected by growth or decay processes. $H_2$ supply is modeled using a completely mixed compartment containing only $H_2$ diffusively linked to the base of the hydrogel.

The 1-D model solves for concentrations of $NO_2^-$ and $H_2$ based on the equation and diffusion effects as described previously. By-product formation and the effect of pH was not evaluated in this model. A complete account of reactor conditions and constants used in the model is given in Table 6. Reactor configuration constants were selected to maintain consistency with previous work and simulate the operation of an 8-strand CHMR operating in CSTR mode with a total reactor volume of 120 mL and 3 mL/min influent flow rate, leading to a hydraulic retention time of 40 minutes. Influent $NO_2^-$ is 1.78 mol-N m$^{-3}$ (mmol L$^{-1}$) and the lumen $H_2$ pressure is a constant 1.2 atm, equivalent to open mode operation of a reactor at 3 psig. The area of the membrane is given according to the surface area of 8 strands. This model does not take cylindrical 3D structure into account. Pd loading is given as a density that is equivalent to densities measured in previous work, while hydrogel and liquid diffusion layer thickness are taken from previous OCT and microsensor work, respectively.

FIGS. 17A and 17B show the model output of the concentration profiles of $NO_2^-$ and $H_2$ at steady-state conditions. $H_2$ diffuses from the HFM wall into the hydrogel, where a concentration profile develops that is dependent on both diffusive transport and catalytic reaction. A similar, but counter-diffusional, profile develops for $NO_2^-$, as it diffuses from the bulk through the LDL and into the hydrogel, where it is also subject to both reaction and diffusion processes. As the $H_2$ partial pressure in the lumen increases with a constant influent $NO_2^-$ concentration, the concentration profile shape of both $NO_2^-$ and $H_2$ within the hydrogel change (FIG. 17A). At the lowest $H_2$ partial pressures, $H_2$ is rapidly consumed by reaction as it leaves the HFM wall and travels into the hydrogel. The RZ (gray region) is made up of only a small fraction of the portion of the hydrogel nearest the HFM wall. $NO_2^-$ fully penetrates the hydrogel and the $NO_2^-$ concentration within the hydrogel is relatively constant, suggesting low catalytic reaction rates and confirms the low $NO_2^-$ removal rates observed experimentally. As $H_2$ concentrations increase, $H_2$ penetrates deeper into the hydrogel towards the bulk before it is completely consumed by reaction with $NO_2^-$. The increased presence of $H_2$ throughout the membrane generates increased reaction rate, causing an increase in the $NO_2^-$ concentration gradient as $NO_2^-$ is more rapidly consumed. Further, the RZ expands and shifts towards the hydrogel exterior as the $H_2$ partial pressure increases, decreasing the average diffusive transport distance for $NO_2^-$ before reaction. At the highest $H_2$ concentrations, the diffusive transport distance for $NO_2^-$ to enter the RZ is minimized and $NO_2^-$ reaction rates are maximized. The observed concentration profile changes with increasing reactive species concentrations correlate well with the shifts in experimentally measured r' with changes in reactive species concentration.

When $NO_2^-$ influent concentrations are increased at constant $H_2$ pressure, concentration profiles shift in a corresponding manner (FIG. 17B). At the lowest $NO_2^-$ concentration, all $NO_2^-$ is consumed in a shallow RZ near the hydrogel edge, as $H_2$ diffuses across much of the hydrogel towards the bulk before reaching $NO_2^-$ species. Increasing the $NO_2^-$ concentration causes the RZ to move deeper into the hydrogel as $NO_2^-$ diffuses further before being consumed by reaction. Finally, at the highest $NO_2^-$ concentration, $NO_2^-$ penetrates the entirety of the catalytic hydrogel without being fully consumed, while all $H_2$ is consumed rapidly near the HFM wall. As $NO_2^-$ concentrations increase, the diffusive transport distance of $NO_2^-$ through the hydrogel to the RZ increases. Diffusive mass transport limitations become progressively more influential on overall kinetics as insufficient $H_2$ is delivered to the catalytic hydrogel through the lumen wall to fully reduce $NO_2^-$ and removal rates no longer increase with increased $NO_2^-$ concentrations. This trend corresponds well with the experimental results observed in FIGS. 15A-15E, where increases in the $NO_2^-$ influent concentration increases r' until a limit (which is dependent on $H_2$%) is reached, confirming the role of diffusive transport on limiting observed reaction rates.

Effect of Catalyst Deactivating Species $SO_3^{2-}$, $HS^-$, and natural organic matter (NOM) were used to evaluate their effect on the $NO_2^-$ reduction activity caused by catalyst deactivation. In each experiment, the influent reservoir contained 1.78 mM $NaNO_2$, 10 mM $NaHCO_3$, and 1.4 mM $CaCl_2$. The CHMR was operated until steady-state conditions were reached with respect to $NO_2^-$ reduction. Then, the influent reservoir was spiked with one of the species causing deactivation: 5 mg-S/L sodium sulfite nonahydrate ($Na_2SO_3$, anhydrous, AA65122-14, Alfa Aesar) or 1 mg-S/L sodium sulfide ($Na_2S.9H_2O$, 98%, #BJ208043, Fluka), or 5 mg/L Suwanee River NOM (2R101N, International Humic Substances Society). The effect of the deactivating species was evaluated for up to 15 hrs by periodic sampling of $NO_2^-$ for subsequent IC analysis. For the $SO_3^{2-}$ and NOM experiments, $CO_2$ was bubbled in the influent reservoir to buffer the pH to ~5.8. For $HS^-$, no $CO_2$ was used and the pH was kept at ~8.2 to avoid formation of $H_2S$ ($pK_a$=7.02).

Figures 18A, 18B, 18C:
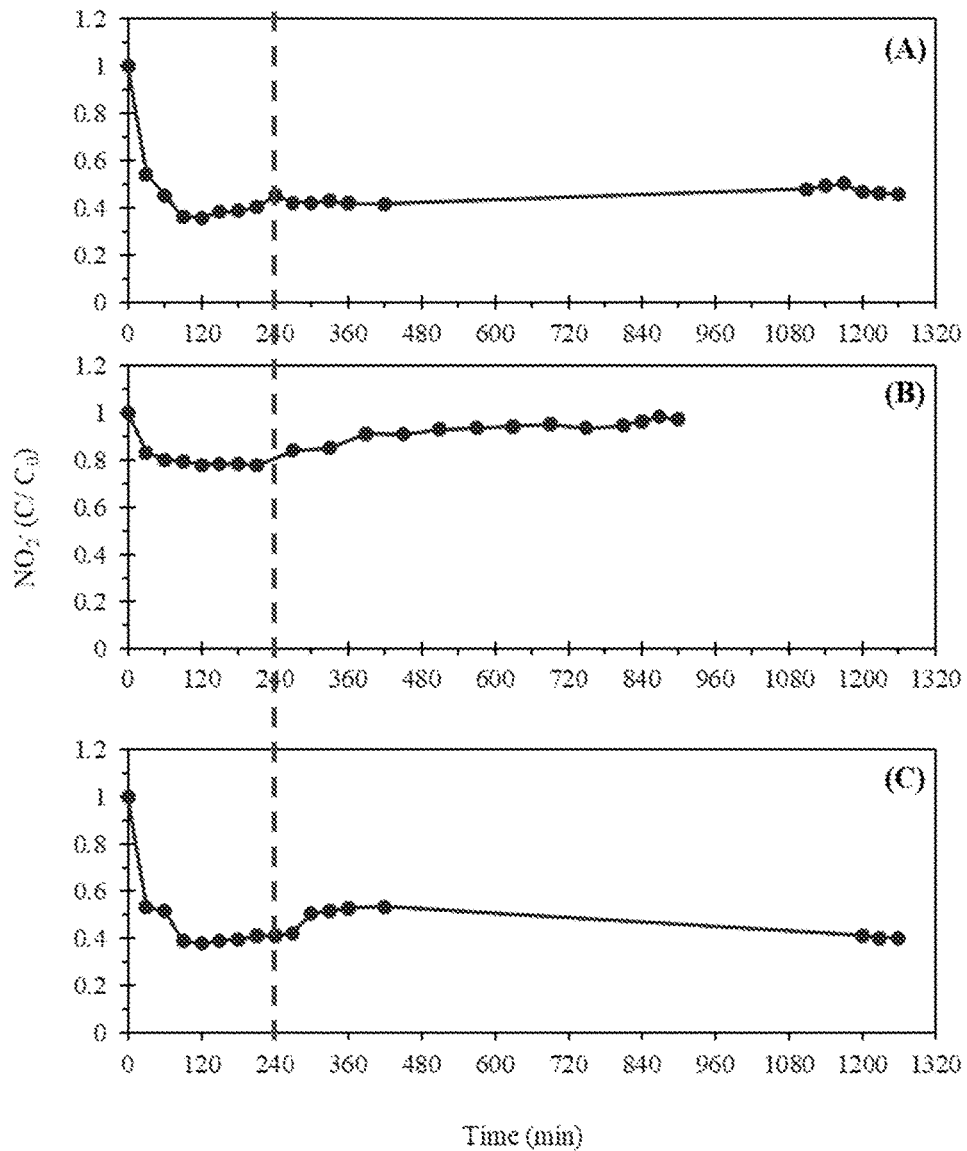
FIGS. 18A-18C show a long-term continuous operation of a CHMR in the presence of known deactivation species 5 mg-S/L $SO_3^{2-}$ (FIG. 18A), 1 mg-S/L $HS^-$ (FIG. 18B), and 5 mg/L NOM (FIG. 18C). The $HS^-$ experiment was conducted in the absence $CO_2$ to avoid acidic pH and the formation of $H_2S$. The vertical red dashed line represents the time point when the species was spiked into the influent reservoir.

To investigate the effects of known Pd deactivating species on the catalytic activity of the CHMR, experiments were conducted in the presence of $SO_3^{2-}$, $HS^-$, and NOM for at least 12 h (FIGS. 18A-18C). The addition of $SO_3^{2-}$ (5 mg-S/L) resulted in a steady loss of conversion from 61.5% to 50.9%, indicating deactivation of the catalyst (FIG. 18A). A similar behavior was observed when $HS^-$ (1 mg-S/L) was spiked into the reactor in a separate experiment (FIG. 18B). The initial steady-state conversion was lower than the other species because $CO_2$ was not used to prevent the formation of $H_2S$ at acidic pH. Conversion in the absence of $HS^-$ and $CO_2$ was 21.8%, and this steadily decreased to 2.5% after $HS^-$ was spiked into the reactor (FIG. 18B), indicating deactivation had occurred. For NOM (5 mg/L), a different trend was observed compared to the other species. Initially after adding NOM, the conversion dropped from 60.3% to 46.8% after 2.5 hrs, but the conversion returned to 58.4% after an additional 12 hrs of exposure (FIG. 18C). This behavior suggests that the deactivating effects of NOM in the CHMR were temporary. These results provide evidence that some protection from deactivation is provided by the hydrogel, especially in the case of NOM.

Figure 19:
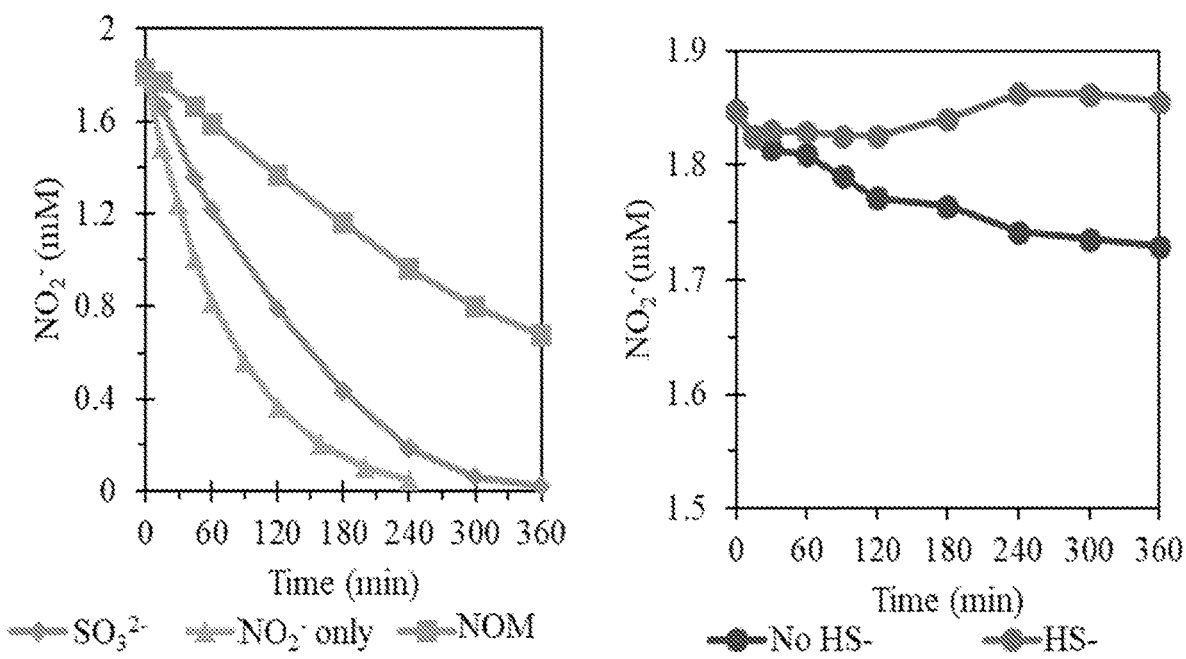
FIG. 19 shows kinetics of $NO_2^-$ removal by catalytic hydrogenation using CHM recovered Pd nanoparticles in a suspended catalyst batch reactor system with relevant catalyst deactivating species. Left panel shows the results of $NO_2^-$ only and in the presence of $SO_3^{2-}$ or DOM ($CO_2$ bubbling, pH 5.8-6.3). Right panel shows the results of $NO_2^-$ only and in the presence of $HS^-$ (no $CO_2$ bubbling, pH 8.2-9.5).

To determine the role of the hydrogel, the effect of these deactivating species on the intrinsic catalytic activity of the Pd nanoparticles in the absence of a hydrogel was evaluated using suspended batch reactor experiments (FIG. 19). In the absence of deactivating species, the k' was L mol-$Pd^{-1}$ $s^{-1}$, and this decreased to 0.648 and 0.299 L mol-$Pd^{-1}$ $s^{-1}$ in the presence of $SO_3^{2-}$ and NOM, respectively. When $HS^-$ was present, no $NO_2^-$ removal was observed, suggesting that $HS^-$ had severely deactivated the catalyst; however, poor removal was observed even when no $HS^-$ was present (FIG. 19) due to the high pH ($pH_{final}$≈9.5) when no $CO_2$ was used. These results suggest that deactivation of Pd by sulfur compounds remains a challenge. The cause of the reduced deactivation effect of NOM using the CHMR is less clear. Batch experiments with suspended particles showed that NOM deactivated Pd somewhat, but it was lower in the CHMR. This suggests that the hydrogel prevented NOM-Pd interactions, which may be related to the poor transport of the larger NOM species through the hydrogel.

Batch Suspension Reactions Using Recovered Pd Nanoparticles Pd nanoparticles were first isolated from the hydrogels by dissolving the Ca-alginate in a solution of ethylenediaminetetraacetic acid (EDTA, 0.1 M) and sodium citrate (0.2 M). The particles were recovered by centrifugation with intermittent washing with ultrapure water (n=3). For the batch experiments, Pd nanoparticles (1.13 and 4.87 mg) were suspended in a 60-mL solution containing $NaNO_2$ (1.78 mM), $NaHCO_3$ (10 mM), and $CaCl_2$ (1.4 mM). $CO_2$ (100 mL/min) and $H_2$ (150 mL/min) were bubbled continuously into the reactor. Pd masses similar to those used in the CHMR experiments (low and high loadings) were used. Periodic aqueous samples were taken, filtered, and then the $NO_2^-$ and $NH_4^+$ concentrations were analyzed using IC. All batch experiments were repeated using 1.13 mg Pd in the presence of the deactivating species.

Suspended catalyst batch experiments were performed to evaluate the effects of catalyst deactivating species on catalytic function of recovered nanoparticles. Pd nanoparticles (1.13 mg) were dispersed in a 60-mL solution containing sodium bicarbonate (10 mM) and $CaCl_2$ (1.4 mM) and either $Na_2SO_3$ (5 mg-S/L), SRNOM (5 mg/L) or $Na_2S$ (1 mg-S/L). $CO_2$ bubbling (100 ml/min) was used again for $Na_2SO_3$ and SRNOM, but not $Na_2S$ to avoid formation of $H_2S$. The Pd nanoparticles were stirred with $H_2$ bubbling (150 mL/min) for 1 hour prior to addition of 0.6 mL of 178 mM NaNO2 to bring initial $NO_2^-$ concentration to 1.78 mM. Samples were taken hourly for analysis by IC.

Effect of Co-ions on the Stability of the Hydrogel The stability of the Ca-alginate hydrogel in the presence of de-linking ions ($H^+$, $Na^+$) was investigated by exposing Ca-alginate hydrogels to various aqueous conditions. Ca-alginate hydrogels were grown on HFMs and then submerged in vessels containing an aqueous solution of desired composition for 7 d. No mixing was used so that only chemical stability changes were observed. The changes in the concentrations of $Ca^{2+}$ and Pd in aqueous solution and the CHM mass were used as metrics for evaluating the stability. The change in the CHM mass is reported as a mass ratio, equal to the CHM wet mass in ultrapure water (at equilibrium) divided by the CHM wet mass after being exposed to selected aqueous conditions for 7 d. The mass ratio indicates swelling or contraction of the hydrogel structure due to changes in the total number of crosslinked sites. The conditions evaluated in the 7 d experiments were: 0.5, 5, and 50 mM total concentration of either NaCl, $CaCl_2$, or $NaCl+CaCl_2$ (10:1.4 molar ratio). Additional hydrogel stability experiments were conducted by exposing the CHM to a hard groundwater for 21 d and comparing the results to ultrapure water.

To investigate Ca-alginate hydrogel stability under common environmental conditions (e.g., ions, pH, etc.), a series of experiments were undertaken to evaluate hydrogel swelling, $Ca^{2+}$ ion release, and Pd leaching over time under varying aqueous conditions. First a set of 3 Ca-alginate hydrogels were grown on HFMs, washed in ultrapure water baths 3 times, and then allowed to rest individually in 50 mL of ultrapure water for approximately 6 hours. Then a 1-mL aqueous sample was taken from each vessel for analysis of $Ca^{2+}$ ions and the pH of the solution was recorded. Then, the pH was lowered by approximately one unit using 1 M HCl. The CHMs were allowed to rest in the pH adjusted solution for at least 6 hours before an additional IC sample was collected. This process was repeated 4 more times until the solution pH was approximately 1.6. IC analysis of $Ca^{2+}$ ions was used to evaluate the release of $Ca^{2+}$ from the hydrogel matrix as a function of pH.

Additionally, to investigate possible hydrogel instability and Pd-leaching during exposure to common aqueous species, Pd-bearing CHMs were synthesized according to the previously described methods and a wet mass was recorded. Then, a set of 3 CHMs were exposed to 50 mL of either ultrapure water, groundwater (Table 10), sodium chloride solution (0.5 mM), calcium chloride solution (0.5 mM), or a mixture of sodium and calcium chloride (10:1.4 molar ratio, total molarity 0.5 mM) for one week. After 1 week, aqueous samples were retained from each vessel for analysis of Pd leaching by ICP-OES and. One CHM from each aqueous condition was sacrificed for analysis, and wet mass of this CHM was recorded, then the hydrogel was allowed to air-dry overnight and the dry mass was recorded. The remaining CHMs were retained in respective aqueous conditions, and the molarity of the sodium/calcium solutions was spiked to total molarity of 5 mM. The CHMs were again allowed to rest for 1 week and then analyzed as described previously, with one of the CHMs from each condition sacrificed. After analysis, the molarity of sodium/calcium solutions was increased to 50 mM and allowed to rest for an additional week. After this (3-week period total), the final CHMs were analyzed as described previously. Dried hydrogels were digested by microwave digestion and analyzed by ICP to quantify total Pd.

TABLE 10

Characterization of groundwater

| Species | Concentration (mg/L) |
|---|---|
| ammonia | ND |
| nitrate | ND |
| nitrite | ND |
| total alkalinity | 131 |
| total organic carbon | 2.29 |
| chloride | 120 |
| sulfate | 51.2 |
| sodium | 102 |
| potassium | 2.66 |
| magnesium | 30.2 |
| calcium | 109 |

The long-term stability of the Ca-alginate hydrogel is a critical challenge to implementation of CHMRs for treatment of drinking water. FIGS. 20A-20C show the stability of hydrogels coated on HFMs or a range of aqueous conditions relevant to water treatment. The effect of pH on stability of Ca-alginate hydrogels (no Pd) was evaluated between neutral and acidic pH (FIG. 20A). Below pH 4, $Ca^{2+}$ was released from the hydrogel, consistent with the protonation of guluronic ($pK_a$=3.65) and mannuronic ($pK_a$=3.38) acid moieties of alginate and the transition of the Ca-alginate to alginic acid. The expulsion of $Ca^{2+}$ from the hydrogel crosslink sites caused the gel to shift from transparent to opaque, as the chemical structure transitions from ionically bound Ca-alginate to alginic acid gel stabilized by hydrogen bonding. This transition hampered attempts to investigate catalytic function at acidic pH because the resulting alginic acid gel degraded rapidly due to mixing shear forces. Thus, limiting the aqueous pH above the $pK_a$ of alginic functional groups is critical to long-term stability and catalytic performance of Ca-alginate based CHMR. Operation at pH 5.8-6.3, as conducted in this study, provided an optimal catalytic activity while preventing instability of the Ca-alginate hydrogel.

Ionic exchange of monovalent cations (e.g., $Na^+$) with $Ca^{2+}$ at crosslink sites can eliminate connections between polymer strands and break down the 3D structure of the hydrogel. To investigate the effects of monovalent cations on the hydrogel stability and behavior, the mass ratio of CHMs was measured after exposure to solutions of increasing total concentrations of either $Na^+$ only, $Ca^{2+}$ only, or a mixture of $Na^+$ and $Ca^{2+}$ (FIG. 20B). When only $Na^+$ was present, the hydrogel swelled proportionally to the concentration of $Na^+$, indicating a loss of Ca-alginate crosslinked sites as $Na^+$ exchanged with $Ca^{2+}$. The addition of $Ca^{2+}$ to the aqueous phase prevented swelling of the hydrogel, which was attributed to the affinity of alginate sites for the $Ca^{2+}$. When both $Na^+$ and $Ca^{2+}$ were present at a total concentration of 50 mM (43.8 mM $Na^+$, 6.14 mM $Ca^{2+}$; 10:1.4 molar ratio), the hydrogel contracted due to crosslinking of new sites from the additional $Ca^{2+}$. These sites were likely initially filled by $Pd^{2+}$ species prior to reduction to $Pd^0$, thus leaving them open. Indeed, when no $Na^+$ was present, hydrogel contraction was observed even at low $Ca^{2+}$ concentrations (e.g., <0.5 mM). Overall, the mass-ratio results showed that hydrogel swelling was dependent on the concentration and valence of cations in the aqueous phase. Contraction and/or swelling of the hydrogel influences the overall catalytic performance of the CHMR because the hydrogel density will influence diffusivity of aqueous species, and the hydrogel thickness affects mass transport distances.

To investigate the changes in hydrogel swelling under relevant aqueous conditions, the mass-ratio of hydrogels was measured over 21 d in an ultrapure water or a groundwater (FIG. 6C). No significant hydrogel swelling/contraction (<6% mass-ratio change) was observed over this period in either matrix, suggesting that hydrogel structural changes were minimal. The $Na^+/Ca^{2+}$ molar ratio (10:6.1; 4.4 mM $Na^+$, 2.7 mM $Ca^{2+}$) and total $[Na^+ + Ca^{2+}]$ concentration (7.1 mM) of the groundwater (Table 10) were similar to those for the model $Na^+/Ca^{2+}$ mixture at 5 mM (4.4 mM $Na^+$, 0.61 mM $Ca^{2+}$). A comparable contraction behavior between the two was observed with mass ratios of 0.94 and 0.87, respectively. The groundwater also contained 1.25 mM $Mg^{2+}$ and this may have contributed to the crosslinking, although the affinity of alginate cross-link sites for $Mg^{2+}$ is lower than $Ca^{2+}$.

The tendency of Pd-nanoparticles to leach from the catalytic hydrogel during the stability experiments was investigated by measuring Pd concentrations in the aqueous phase after the soaking period. Pd was only detected in the aqueous phase when concentrations of $Na^+$ greater than 50 mM were used. After exposure to a 50 mM $Na^+$ solution, only 2.5 μg (0.29%) of the total Pd present in the hydrogel was detected in the aqueous phase. Pd leaching is attributed to de-linking and swelling of hydrogel structure. When major hydrogel swelling was avoided, no detectable Pd leaching was observed. These results show that groundwaters are excellent candidates for the CHMR due to the presence of divalent cations that reduce hydrogel swelling. Source waters with high concentrations of monovalent cations and low concentrations of divalent cations (e.g., some surface waters) may need pretreatment (addition of $Ca^{2+}$ salts) before the CHMR due to the expansion and degradation of the Ca-alginate hydrogel.

While specific embodiments of the invention have been described, it is understood that the present invention could take on a variety of other forms. Various features and advantages of the invention are set forth in the following claims.

What is claimed is:

1. A catalytic assembly comprising:
   a hollow fiber membrane comprising an inner surface defining a channel and an outer surface, wherein the hollow fiber membrane is permeable to a gas;
   a reactive coating comprising an alginate hydrogel on the outer surface of the hollow fiber membrane, wherein the reactive coating is permeable to the gas and a contaminant; and
   a plurality of catalytic palladium nanoparticles embedded in the reactive coating adapted to catalyze a reaction between the gas and the contaminant,
   wherein a dry weight ratio of the palladium nanoparticles to the alginate hydrogel is about 1:100 to about 20:100.

2. The catalytic assembly of claim 1, wherein the hollow fiber membrane comprises silicone.

3. The catalytic assembly of either claim 1, wherein the hollow fiber membrane has an outer diameter of about 500 μm to about 2000 μm, and an inner diameter of about 250 μm to about 1000 μm.

4. The catalytic assembly of claim 1, wherein the reactive coating has a thickness of about 10 μm to about 2,000 μm.

5. The catalytic assembly of claim 1, wherein the gas is hydrogen.

6. The catalytic assembly of claim 1, wherein the catalytic palladium nanoparticles have an average particle size of about 1.0 nm to about 10.0 nm.

7. The catalytic assembly of claim 1, wherein the catalytic palladium nanoparticles are capable of catalyzing a hydrogenation reaction.

8. The catalytic assembly of claim 1, wherein the contaminant comprises a halogenated alkane, a halogenated ethylene, a halogenated aromatic compound, a nitrate, a nitrite, a bromate, a chlorite, a chlorate, a perchlorate, or a combination thereof.

9. The catalytic assembly of claim 1, wherein the contaminant comprises a nitrite.

10. A method for water treatment, comprising
    contacting a catalytic assembly of claim 1 with a volume of water comprising the contaminant, whereupon the contaminant permeates into the reactive coating; and
    flowing the gas through the channel defined by the inner surface of the hollow fiber membrane, whereupon the gas permeates through the hollow fiber membrane into the reactive coating and the catalytic palladium nanoparticles catalyze the reaction between the gas and the contaminant.

11. The method of claim 10, wherein the water has a pH between about 4.0 and about 9.0.

12. The method of claim 10, wherein the concentration of the contaminant is about 0.01 mM to about 2.0 mM.

13. The method of claim 10, wherein the reactive membrane has a thickness between about 10 μm and about 2,000 μm.

14. The method of claim 10, wherein the gas is hydrogen, which is at a pressure of about 1.0 psi to about 5.0 psi.

15. The method of claim 10, wherein the contaminant is reduced in the reaction.

16. A method of preparing a catalytic assembly, comprising:
    inserting a hollow fiber membrane into a first solution comprising alginate, wherein the hollow fiber member comprises an inner surface defining a channel and an outer surface;
    removing the hollow fiber membrane from the first solution, wherein the outer surface of the hollow fiber membrane is at least partially coated with an alginate solution coating;
    inserting the hollow fiber membrane with the alginate solution coating into a second solution comprising $Ca^{2+}$ and $Pd^{2+}$, whereupon the $Ca^{2+}$ reacts with the alginate in the alginate solution coating to form a hydrogel coating on the outer surface of the hollow fiber membrane, wherein the hydrogel coating comprises Ca-crosslinked alginate, and wherein $Pd^{2+}$ ions are dispersed throughout the hydrogel coating; and
    removing the hollow fiber membrane with the hydrogel coating from the second solution and inserting the hollow fiber membrane with the hydrogel coating into a third solution comprising $NaBH_4$, whereupon the $NaBH_4$ reduces the $Pd^{2+}$ ions dispersed throughout the hydrogel coating to form Pd nanoparticles embedded in the hydrogel coating.

17. The method of claim 16, wherein the hollow fiber membrane comprises silicone.

18. The method of claim 16, wherein first solution comprises sodium alginate.

19. The method of claim 16, wherein second solution comprises calcium chloride.

* * * * *